(12) United States Patent
Ma et al.

(10) Patent No.: US 10,506,262 B2
(45) Date of Patent: Dec. 10, 2019

(54) METHOD AND SYSTEM FOR OPTIMIZED MEDIA DELIVERY

(71) Applicant: TELEFONAKTIEBOLAGET LM ERICSSON (PUBL), Stockholm (SE)

(72) Inventors: Kevin Ma, Nashua, NH (US); Göran Eriksson, Norrtälje (SE); Daniel Biagini, Bolton, MA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 410 days.

(21) Appl. No.: 15/383,833

(22) Filed: Dec. 19, 2016

(65) Prior Publication Data

US 2017/0188054 A1 Jun. 29, 2017

Related U.S. Application Data

(60) Provisional application No. 62/272,399, filed on Dec. 29, 2015.

(51) Int. Cl.
*H04N 21/2183* (2011.01)
*H04L 29/08* (2006.01)
(Continued)

(52) U.S. Cl.
CPC ......... *H04N 21/2183* (2013.01); *H04L 67/02* (2013.01); *H04L 67/18* (2013.01);
(Continued)

(58) Field of Classification Search
CPC ........... H04N 21/2183; H04N 21/6125; H04N 21/2662; H04L 67/2866; H04L 67/26; H04L 67/2847; H04L 67/02; H04L 67/2814; H04L 67/18; H04L 65/602; H04L 65/4084; H04L 1/0076; H04L 5/0032; H04L 9/08; H04L 9/0816; H04L 9/0819; H04L 9/083; H04L 9/3268; H04L 12/189; H04L 12/2838; H04L 12/2874; H04L 12/2878; H04L 12/2896; H04L 12/40117; H04L 13/10; H04L 13/12; H04L 13/14; H04L 25/02; H04L 25/42; H04L 2463/062; H04L 2209/608; H04L 2209/606; H04L 2209/605; H04L 2209/603; H04L 2209/601; H04L 2209/60; H04L 67/1097

See application file for complete search history.

(56) References Cited

U.S. PATENT DOCUMENTS 7,197,566 B1 3/2007 Kuzma
2004/0117490 A1* 6/2004 Peterka .................. G06F 15/16
(Continued)

*Primary Examiner* — Benjamin R Bruckart
*Assistant Examiner* — Anthony Bantamoi

(57) ABSTRACT

A system and method for distributing content in an adaptive bitrate (ABR) streaming network. In one embodiment, an origin server receives an initial content request from a client device for a particular content, the client device operative with an ABR streaming media player. Depending on the information received in the initial content request, a local cache proximate to the client device requesting the particular content is located. The requested is then pushed to the local cache, whereupon a response message is generated to the client device, responsive to the initial content request, the response message including location information of the particular content with respect to the local cache.

22 Claims, 13 Drawing Sheets

(51) Int. Cl.
*H04N 21/2662* (2011.01)
*H04N 21/61* (2011.01)
*H04L 29/06* (2006.01)

(52) U.S. Cl.
CPC .......... *H04L 67/26* (2013.01); *H04L 67/2814* (2013.01); *H04L 67/2847* (2013.01); *H04L 67/2866* (2013.01); *H04N 21/2662* (2013.01); *H04N 21/6125* (2013.01); *H04L 65/4084* (2013.01); *H04L 65/602* (2013.01)

(56) References Cited

U.S. PATENT DOCUMENTS

2006/0253608 A1* 11/2006 Reynolds ................. G06F 15/16
2010/0115122 A1* 5/2010 Ramadas ................. G06F 15/16
2013/0152070 A1* 6/2013 Bhullar .................... G06F 9/44
2015/0040173 A1* 2/2015 Panagos .................. H04L 45/74
2015/0263916 A1    9/2015 Phillips et al.

* cited by examiner

METHOD AND SYSTEM FOR OPTIMIZED MEDIA DELIVERY

PRIORITY UNDER 35 U.S.C. § 119(e) & 37 C.F.R. § 1.78

This nonprovisional application claims priority based upon the following prior United States provisional patent application(s): (i) "METHOD AND SYSTEM FOR OPTIMIZED MEDIA DELIVERY," Application No. 62/272,399, filed Dec. 29, 2015, in the name(s) of Kevin Ma and Göran Eriksson; each of which is hereby incorporated by reference in its entirety.

FIELD OF THE DISCLOSURE

The present disclosure generally relates to communication networks. More particularly, and not by way of any limitation, the present disclosure is directed to optimized media delivery, e.g., in cloud DVR and/or Over-the-Top (OTT) networks.

BACKGROUND

The near universal adoption of Internet protocol (IP) as a standard for digital transmission is revolutionizing the traditional way of video delivery. Typical applications such as IPTV and live video streaming have become increasingly popular over the Internet. To efficiently utilize the bandwidth resources of the network in these applications, the video is usually compressed with suitable media coding schemes and then delivered only to subscribers who request it. For data delivery, multicast is considered the most efficient paradigm for such applications, but the scalability issue of traditional IP multicast hinders the deployment of a large-scale video delivery system with numerous channels.

Content Delivery Networks (CDNs) are also commonly used, both to provide a generic content delivery infrastructure (taking advantage of economies of scale, by aggregating content from multiple content providers) and to extend geographic footprint (allowing content providers to reach clients outside of their normal distribution area, without having to build out their own physical infrastructure). Geographic footprint extension works well when a content provider is expanding into a new locale; however, for content delivery to a sparse set of nomadic clients, footprint extension can be expensive.

Whereas the widespread adoption of CDNs has reduced latency and the amount of traffic carried by backbone networks, existing CDN technology requires content providers to delegate their valuable content and expose traffic to the CDN provider, thereby compromising end user privacy and security while revealing valuable business information. By adopting https, the content delivery process becomes more robust, and both user security and privacy improve. However, the use of end-to-end encryption takes away the ability for the network service provider to use transparent inline caches to serve previously requested content, thus increasing backbone traffic as all requests for content have to be forwarded to and served by the content provider. Large content providers can sidestep this issue by placing content on their own edge servers, but this approach is costly and increases system complexity.

SUMMARY

The present patent disclosure is broadly directed to systems, methods, apparatuses, as well as client devices and associated non-transitory computer-readable media for facilitating and/or performing client-initiated caching with client cache discovery in OTT media delivery with a client-specified cache. A disclosed OTT delivery system may include in one embodiment, a content origin, a client, and a local cache, which may reside either in the home, e.g., as part of the Set-top-box (STB) or home gateway (GW); in the operator network, e.g., with a Digital Subscriber Line Access Multiplexer (DSLAM) and/or Cable Modem Termination System (CMTS) or in a regional data center; in a third-party Content Delivery Network (CDN); in a mobile/cellular network, e.g., with the NodeB/EnodeB, or Radio Network Controller (RNC)/Serving Gateway (SGW); or in any local access network. There are many types of access networks where caching would improve performance of media delivery, as should be appreciated by those skilled in the art upon having a reference hereto. Accordingly, embodiments described herein are suitable for all such media delivery environments.

In one aspect, an embodiment of a method for distributing content in an adaptive bitrate (ABR) streaming network is disclosed. The claimed method recites, inter alia, an origin server receiving an initial content request from a client device for a particular content, the client device operative with an ABR streaming media player. Depending on the information received in the initial content request, a local cache proximate to the client device requesting the particular content is located. The requested is then pushed to the local cache, whereupon a response message is generated to the client device, responsive to the initial content request, the response message including location information of the particular content with respect to the local cache. In a further variation, the initial content request from the client device may include address information of one or more local caches discovered by the client device using a suitable discovery protocol.

In another aspect, an embodiment of a network node or element operating as an origin server disposed in an ABR streaming network is disclosed. The claimed network node includes, inter alia, one or more processors, a plurality of network interfaces configured to receive media assets from one or more content sources, and an optional media (pre) processing unit comprising, e.g., an encoder for generating a plurality of bitrate representations for each media asset, and a segmentation and packaging module for segmenting each of the plurality of bitrate representations of each media asset. One or more persistent memory modules having program instructions stored thereon are included in the network element, which, when executed by the one or more processors, perform the following in association with one or more modules: responsive to receiving an initial content request from a client device for a particular media asset, the client device operative with an ABR streaming media player, locating a local cache proximate to the client device requesting the particular media asset; pushing the particular content in one or more bitrate representations to the local cache; and generating a response message to the client device, responsive to the initial content request, the response message including location information of the particular media asset with respect to the local cache.

In yet another aspect, an embodiment of a client device configured to operate in an ABR streaming network is disclosed. The claimed embodiment includes, inter alia, one or more processors, an ABR streaming media player, and a plurality of network interfaces configured to operate with at least one of a wired access network and a wireless access network. One or more persistent memory modules having program instructions stored thereon are included in the client device which, when executed by the one or more processors, perform the following in association with one or more modules: responsive to receiving a user request for playing a particular content using the ABR streaming media player, adding address information of a local cache to an initial content request for the particular content media asset; and transmitting the initial content request including the address information of the local cache to an origin server disposed in the ABR streaming network in order to facilitate pushing of the particular content to the local cache by the origin server. In a variation, the client device may be further configured to retrieve the requested content pushed to the local cache by the origin server for rendering by the media player. In a further variation, the client device may also be configured to perform determining that a local cache proximate to the client device is not known, and responsive to the determining, effectuating a local cache discovery process and obtaining address information of the discovered local cache(s), and providing the address information of the discovered local cache(s) to the origin server in the initial content request.

Benefits of the present invention include, but not limited to, providing a network architecture and associated systems and methods wherein client-initiated caching can be more efficient and scalable for long tail and/or DVR content. One or more embodiments may advantageously facilitate (pre) positioning, (pre)provisioning, (re)pushing, etc. of the content at one or more locations for caching. In addition, an embodiment of the present invention in accordance with the teachings herein can also enable secure delivery of content if the client can choose a trusted cache/partner, thereby maintaining the integrity of end-to-end content encryption. Additional benefits and advantages of the embodiments will be apparent in view of the following description and accompanying Figures.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, element, virtual appliance, UE device, and the like, mutatis mutandis. Further features of the various embodiments are as claimed in the dependent claims.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
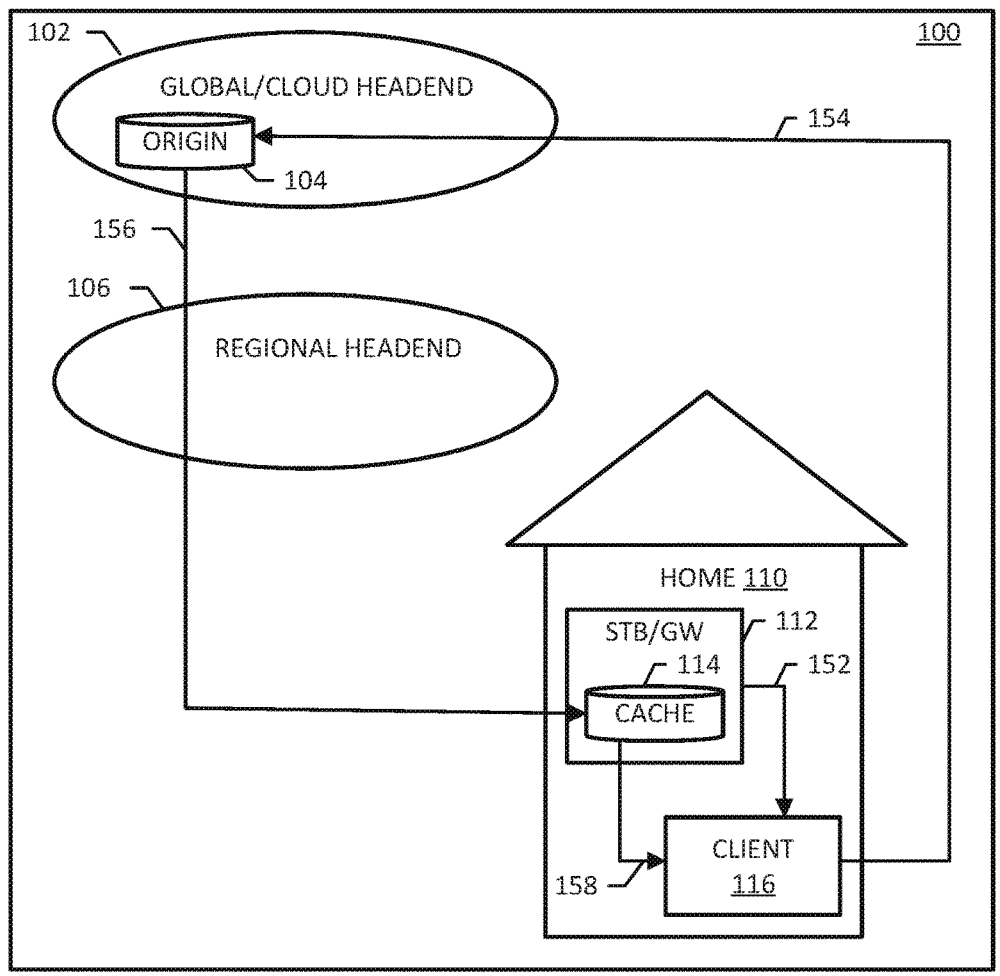
FIG. 1 depicts a block diagram of a system or network environment which may be configured for optimizing personalized media delivery in accordance with one or more embodiments of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be configured for performing or otherwise structurally arranged to perform that function.

As used herein, a network element, node or subsystem may be comprised of one or more pieces of service network equipment, including hardware and software that communicatively interconnects other equipment on a network (e.g., other network elements, end stations, etc.), and is adapted to host one or more applications or services, either in a virtualized or non-virtualized environment, with respect to a plurality of subscribers and associated user equipment that are operative to receive/consume content in an adaptive bitrate (ABR) streaming network. As such, some network elements may be disposed in a wireless radio network environment whereas other network elements may be disposed in a public packet-switched network infrastructure, including or otherwise involving suitable content delivery network (CDN) infrastructure. Further, suitable network elements including one or more embodiments set forth herein may involve terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, a suitable satellite access network architecture or a broadband wireless access network architecture. Accordingly, some network elements may comprise "multiple services network elements" that provide support for multiple network-based functions (e.g., A/V media delivery policy management, session control, QoS policy enforcement, bandwidth scheduling management, content provider priority policy management, streaming policy management, and the like), in addition to providing support for multiple application services (e.g., data and multimedia applications). Example subscriber end stations or client devices may comprise ABR client devices and/or non-ABR client devices, which may include progressive download client devices, for instance, and may comprise content player devices (i.e., players), standalone recording devices (i.e., recorders), as well as equipment stations that may include both functionalities. Illustrative client devices may therefore include any device configured to execute, inter alia, one or more streaming client applications for receiving, recording, storing, and/or rendering content, live media and/or static/on-demand media, from one or more content providers, e.g., via a broadband access network, in accordance with one or more streaming protocols and technologies such as, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. Accordingly, such client devices may include set-top boxes (STBs), networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via a suitable high speed broadband connection for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Figure 9:
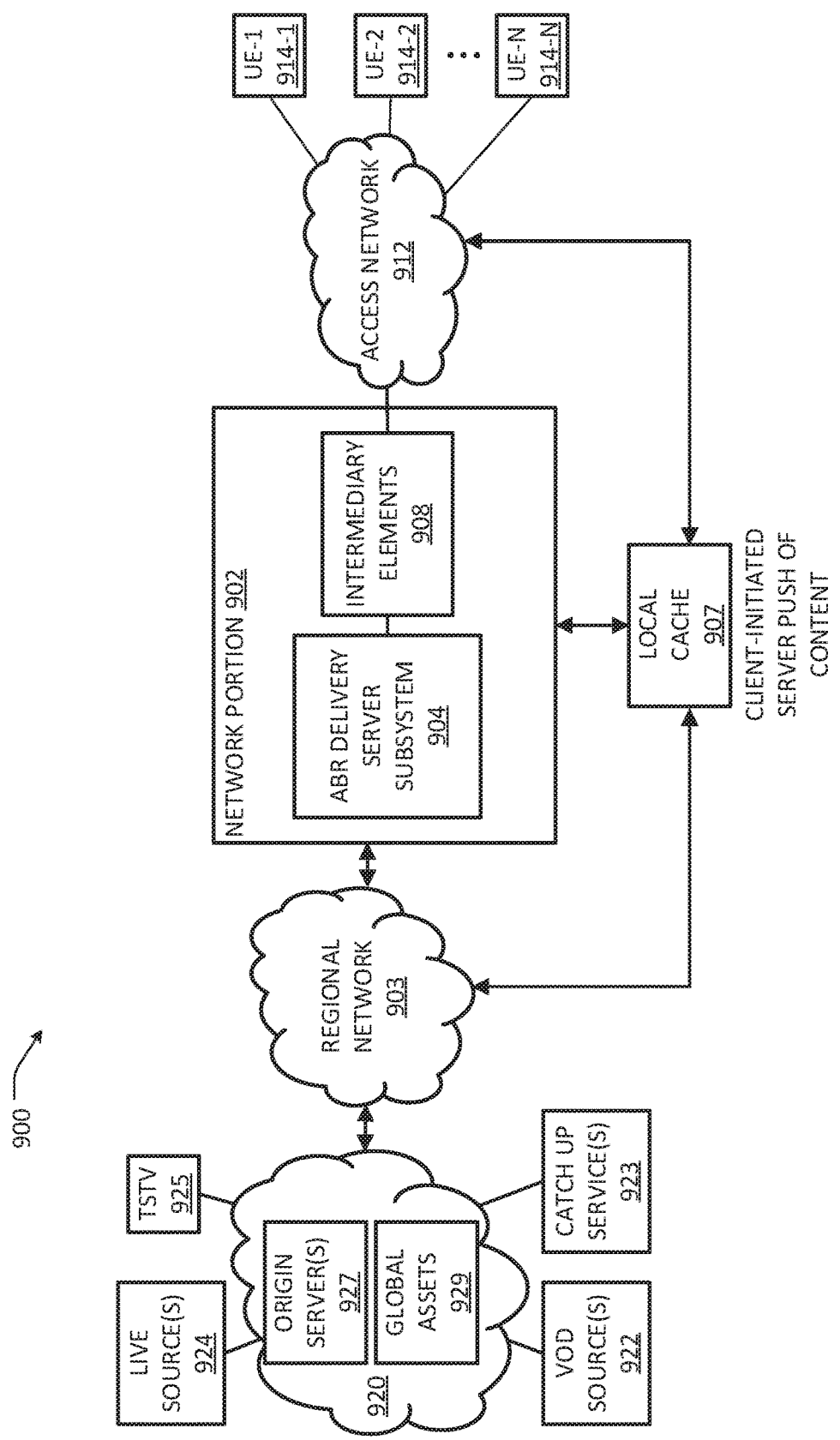
FIG. 9 depicts a generalized example ABR network environment for facilitating optimized media delivery using a push-based local cache architecture according to one or more embodiments of the present patent application.

Referring now to the drawings and more particularly to FIG. 9, depicted therein is a generalized example ABR network environment 900 for facilitating optimized media delivery using a push-based local cache architecture according to one or more embodiments of the present patent application. As will be seen in additional detail hereinbelow, one or more local caches 907 may be provided at various hierarchical levels of the network architecture 900, including a premises gateway (GW) node (not specifically shown), that may be configured to store pushed or pre-provisioned content from an origin server, e.g., origin server 927, responsive to client-initiated content requests. It will be realized that one or more embodiments set forth herein may be advantageously practiced in combination with bandwidth management techniques, delivery optimization methodologies, etc., for example, responsive to a client's video buffer characteristics, client device/display characteristics and configurations, network/connection conditions, and the like, although it is not necessary that all such features be included in a particular embodiment. In general, the terms "media content," "media asset" or "content file" (or, simply "content") as used in reference to at least some embodiments of the present patent disclosure may include digital assets or program assets such as any type of audio/video (A/V) content that may comprise live capture media or static/stored on-demand media, e.g., over-the-air free network television (TV) shows or programs, pay TV broadcast programs via cable networks or satellite networks, free-to-air satellite TV shows, IPTV programs, Over-The-Top (OTT) and Video-On-Demand (VOD) or Movie-On-Demand (MOD) shows or programs, time-shifted TV (TSTV) content, Catch-up service content, etc. By way of illustration, one or more live content sources 924, one or more TSTV content sources 925, one or more static/on-demand content sources 922 (e.g., VOD services and cloud/network DVR content sources), as well as Catch-up TV services 923 are shown in the streaming environment 900 that exemplify various such content sources. Content or media assets from the content sources may be processed, encoded/transcoded, packaged and/or prepared by suitable origin servers 927 for transmission over a core network 920 (e.g., an IP network using one or more transport layer protocols such as UDP or TCP in conjunction with an application layer protocol such as HTTP or other protocols) as segmented content files that are encoded or transcoded at different bitrates (i.e., representations), to a regional network portion 903 and on to an edge network portion 902 (also sometimes referred to as "network edge") serving a plurality of UE devices 914-1 to 914-N via or in association with an access network 912. In one embodiment, there may be one or more CDNs and/or wireless networks disposed in conjunction with or independent of the regional networks for servicing the UE devices 914-1 to 914-N, which in some arrangements may be disposed in subscriber premises as either tethered or non-tethered devices having multi-mode access network connectivity.

An example adaptive streaming server system associated with the network 920, e.g., at a global headend, may be configured to accept media content from live sources and/or static file sources, e.g., online content providers such as Hulu®, Netflix®, YouTube®, or Amazon® Prime, etc. Media content from live sources may comprise live programming captured relative to any type of event, e.g., sporting/entertainment/gaming events, concerts, live TV shows, live news broadcasting, etc. In general operation, the example streaming server system may be configured, under the control of one or more processors executing appropriate program code stored in a persistent memory module, to effectuate adaptive streaming of content as follows. Initially, source media content is transcoded or otherwise encoded with different bit rates (e.g., multi-rate transcoding) using applicable encoder(s). For example, content of a particular program may be transcoded into five video files using variable bit rates (or, synonymously "bitrates" or "resolutions"), ranging from low to high bit rates (500 Kbps to 10 Mbps, by way of illustration). The particular content is therefore encoded as five different "versions" or "resolutions", wherein each bitrate may be referred to as a profile or representation. A segmentation server or segmenter is operative to divide each version of the encoded media content into fixed duration segments or chunks, which are typically between two and ten seconds in duration, thereby generating a plurality of chunk streams. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. One or more suitable metadata files referred to as Manifest Files are then created that describe the encoding rates and Uniform Resource Locator (URL) pointers relative to the various segments of encoded content.

To facilitate distribution/delivery of media segments in multiple streaming technologies, media segments may be packaged using different distribution container formats required by different streaming protocols used by UEs (e.g., HLS protocol, Smooth Streaming protocol, Dynamic Streaming protocol, MPEG DASH protocol, etc.). One skilled in the art will recognize that whereas "distribution" may be generally used to describe the provisioning of media within the core network and out to the edge servers, "delivery" of the media takes place between the edge server and the client, although such terms may be somewhat interchangeably used in the context of one or more embodiments of the present application.

In accordance with the teachings of the present patent application, one or more local caches 907 may be disposed in the regional network 903, edge network 902, access network 912 and/or subscriber premises for storing media assets requested by the client devices that are pushed or pre-positioned by the origin server 927 responsive to client-initiated content requests for particular media assets. It should be appreciated that caches 907 are "local" in the sense they are associated or disposed in a specific network hierarchical infrastructure level and are thus "local" to that particular infrastructure. Therefore, a skilled artisan will recognize that "local caches" are not necessarily locally integrated within client devices as such. Regardless of which hierarchical level a local cache is disposed, media assets and/or manifest files containing metadata information describing the multiple bitrates used for encoding media asset content at different resolutions and location pointers (e.g., URL pointers, etc.) of various segments of encoded media content may be pushed to local caches 907, depending on implementation, responsive to parameters such as, e.g., requesting devices' geolocation, devices' network address information (e.g., IP addresses, MAC addresses, etc.), network bandwidth conditions, and the like, thereby facilitating optimized media delivery to the requesting devices. Accordingly, embodiments set forth herein can advantageously avoid content pulls from central content servers and associated central media storage locations 929 (which may be referred to as global or non-local caches in some implementations) by the requesting devices.

As alluded to previously, example network edge portion 902 may include suitable edge network infrastructure comprising, e.g., an ABR delivery server subsystem 904 for effectuating streaming sessions via the access network 912 for providing requested content or media assets from associated local cache(s) 907. In one example implementation, the access network 912 may be comprised of a DSL network architecture, a DOCSIS-compliant CMTS network architecture, a mobile telecommunications network architecture (e.g., involving LTE, GSM/TDMA/CDMA, $3^{rd}/4^{th}/5^{th}$-Gen or Next Generation Network, etc.), a CDN architecture, a metro Ethernet architecture, and/or a Fiber to the X (home/curb/premises, etc., FTTX) architecture. Accordingly, suitable intermediate elements such as routers, access multiplexers, CMTS nodes, edge origin servers, etc., collectively shown as elements 908, may be provided in association with the network edge 902 for coupling with the access network 912. One skilled in the art will recognize upon reference hereto that local caches 907 may be provided at different hierarchical levels of the network architecture depending on a particular implementation, e.g., super headend (SHE) nodes, regional headend (RHE) nodes, video hub office (VHO) nodes, etc., for example, based on where the content sources and associated ABR processing systems are disposed.

Although not specifically shown in FIG. 9, at least a sub-group of UE devices 914-1 to 114-N may be operative as tethered or untethered customer premises equipment (CPE) devices associated with a subscriber premises that may be serviced via a premises gateway node, STB, or modem, in one example implementation, as previously noted. Regardless of the type of access network 912 or whether a UE device is part of a subscriber premises, a served UE device is operative as and/or may include an ABR streaming client operative with one or more suitable media players configured according to applicable streaming protocols and technologies.

Figure 10:
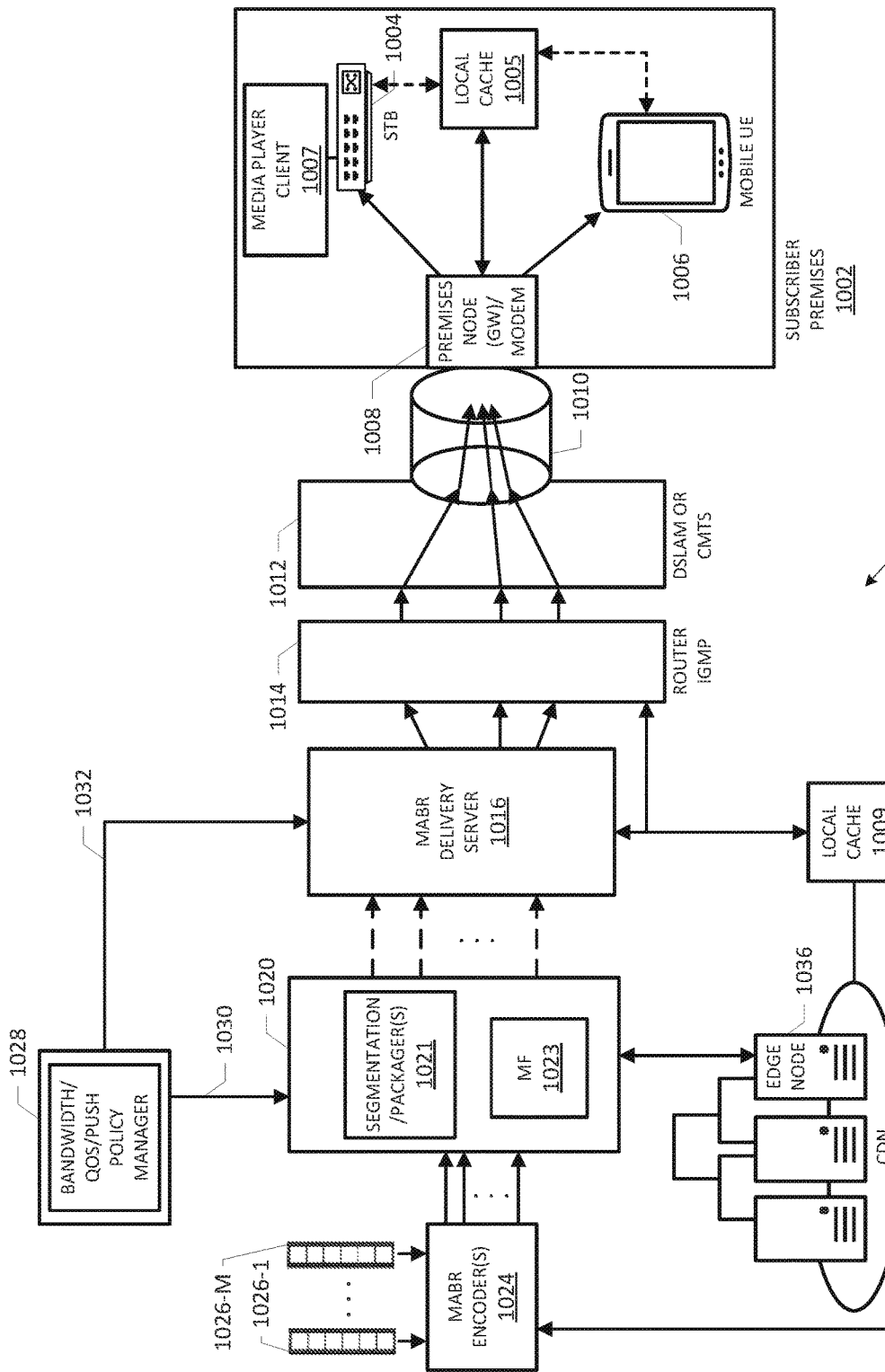
FIG. 10 depicts another aspect of an example ABR network environment with additional elements illustrated according to an embodiment using multicast ABR streaming.

FIG. 10 depicts further aspects of an example ABR network environment 1000 with additional elements illustrated according to an embodiment using multicast ABR (MABR) architecture wherein a plurality of media asset channels may be requested by UE client devices disposed in a subscriber premises 1002. In one embodiment of the present invention, example MABR communications network 1000 may implemented as an end-to-end network architecture for delivering/distributing MABR media content (and other content such as, e.g., advertisement content, where applicable) using any of the streaming technologies mentioned above. By way of example and introduction, MABR streaming delivery is broadly set forth herein that is applicable to both DSL and DOCSIS architectures without necessarily being limited thereto. As will be appreciated by one skilled in the art, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations, as noted hereinabove), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM) and Internet Group Multicast Protocol (IGMP). When a receiver requests a given media item or asset, the network router system finds an existing stream of that content already in the network and directs a copy of it to that receiver from a serving cable headend, a video head office or an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts.

Subscriber premises 1002, which is served by a suitable subscriber bandwidth pipe 1010, is illustratively shown as having a plurality of client devices or substations, e.g., laptops, OTT STBs, smartphones, computers, gaming devices or consoles, tablets, etc., that may consume content from one or more local caches in accordance with an embodiment of the present patent application, wherein a premises gateway or modem 1008 is coupled via bandwidth pipe 1010 to appropriate access network(s). In one implementation, a local cache 1005 may be co-located or otherwise associated with the premises gateway 1008 and/or STB 1004 which may in turn be coupled to a standalone or integrated display device or client media player 1007. A mobile UE 1006 is exemplary of client devices operative to receive content via the premises gateway node 1008 while disposed within the premises 1002 as well as from other local caches disposed in external network infrastructures (e.g., mobile network infrastructure or other CDN(s)) while untethered or away from the premises 1002. In general, UE devices of the premises 1002 may be configured to operate with one or more coder-decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like, in order to receive and render various programming content that is delivered as a plurality of service channels. A premises network (not explicitly shown), which may be implemented using any suitable wireless or wireline network technologies, may be disposed within the premises 1002 for providing connectivity among the UEs, gateway/modem/STBs and premises-based local caches.

As noted previously, subscriber premises 1002 may be served via an access network architected over DSL infrastructure, DOCSIS-compliant CMTS infrastructure, and the like. Accordingly, the subscriber premises bandwidth pipe 1010 may be disposed between subscriber premises 1002 and an access node 1012 such as a DSL Access Multiplexer (DSLAM) node or a CMTS node, wherein the premises node or element 1008 (e.g., a DSL router/gateway or a cable modem) is operative to effectuate communications (including bearer and signaling traffic) with respect to the client devices of the premises 1002. A suitable IGMP switch or router 1014 (e.g., IGMPv2/v3-capable Gigabit Ethernet (GigE) multicast router) is coupled to the access node 1012 for effectuating IGMP Leave/Join messages with respect to joining, leaving or changing various multicast streams corresponding to the service channels available to subscriber stations, e.g., including media players associated with STB 1004 as well as other reach devices, disposed in subscriber premises 1002.

One or more ABR encoders/transcoders 1024, which may be provided as part of a multicast stream formation (MSF) functionality in one example embodiment, are operative to receive a plurality of channel source feeds 1026-1 to 1026-M corresponding to a group of live media channels that may be provided as MABR channels having segmented streams at different bitrate representations. Typically, the ABR encoder/transcoder functionality 1024 receives live feeds from appropriate communications networks, although it is possible in an alternative or additional arrangement for a file-based streamer to read the content files from a disk and stream the content streams from static sources 1027 via a network to the ABR encoder 1024. Accordingly, media channels may comprise a variety of media content assets or programs as noted previously. Additionally, VOD content may also be sourced via a CDN 1034 and associated edge distribution node(s) 1036 as part of service channels provided in a multicast ABR environment. Regardless of how media source feeds are generated and provided in the example network environment 1000, a server node or subsystem 1020 comprising one or more segmentation and packaging (SAP) units 1021 and associated manifest generator(s) 1023 is operative to receive media assets for suitable segmentation and packaging. Depending on implementation, the MBAR segments of media assets may be forwarded to an MABR service node 1016 that provides media channels to IGMP router 1014 for joining and leaving as may be requested by the subscriber stations. Additionally or alternatively, a network-based local cache 1009 (e.g., associated with a CDN, mobile network and/or regional headend) may also be coupled to the MABR delivery server 1016 and associated IGMP architecture 1014 for receiving client-requested media content via multicast techniques. A bandwidth/QoS and push policy manager 1028 may also be provided to generate suitable bandwidth and push policy management signals to service nodes 1020, 1016 via communication paths 1030/1032 in order to configure appropriate levels of encoding bitrates or settings on the server side.

Figure 11A:
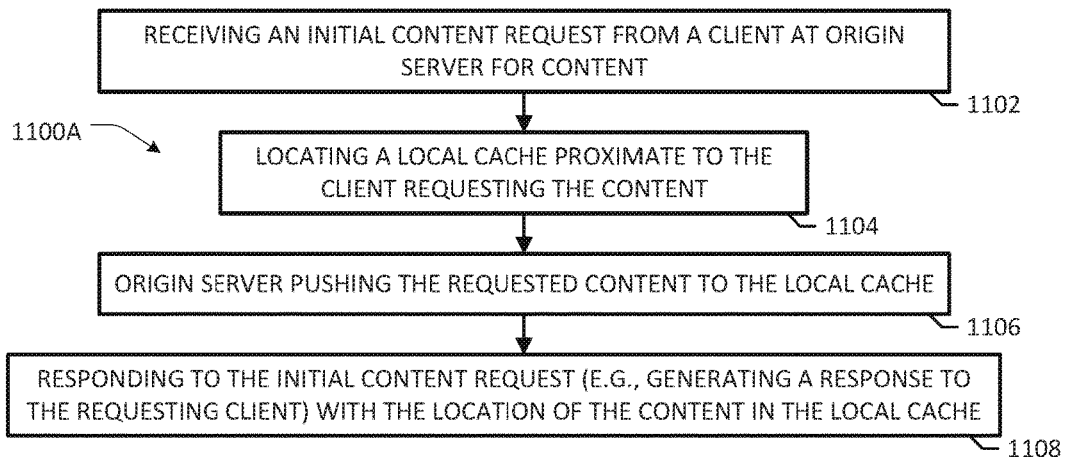
FIGS. 11A-11C are flowcharts of various steps, blocks or acts that may be combined or arranged into one or more embodiments for facilitating optimized media delivery in an example streaming network according to the teachings of the present patent application.
Figure 11B:
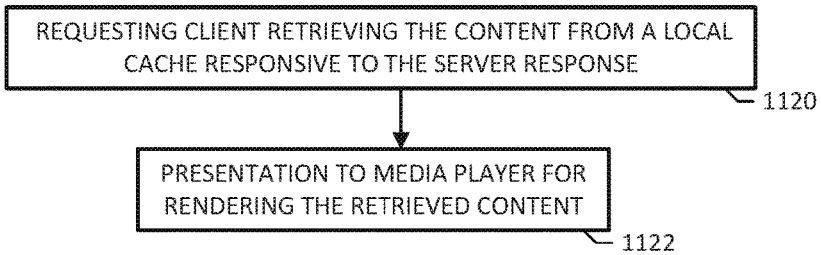
Figure 11C:
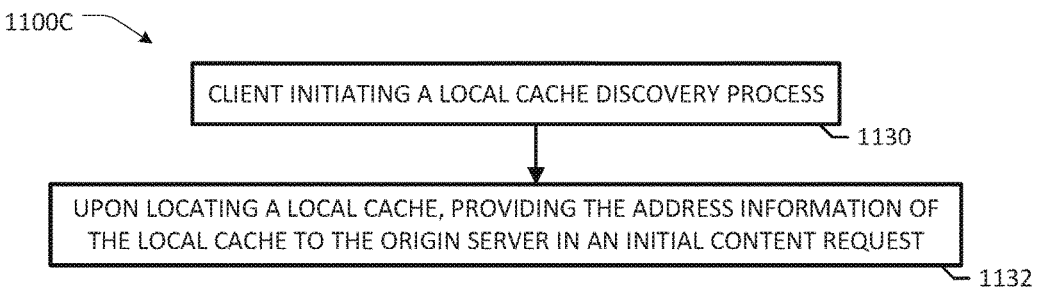

FIGS. 11A-11C depict flowcharts of various steps, blocks or acts that may be effectuated in one or more embodiments for facilitating optimized media delivery in an example streaming network according to the teachings of the present patent application. An example process or scheme 1100A executed at a network node for distributing content in an ABR streaming network is shown in FIG. 11A. At block 1102, an origin server receives an initial content request from a client device for a particular content or media asset, wherein the client device may be preferably configured to execute a client/proxy application that interoperates with an ABR streaming media player. At block 1104, appropriate service logic executing in association with the origin server is operative to locate a local cache proximate to the client device requesting the particular content. Responsive to locating or otherwise determining the local cache proximate to the requesting client device, the particular content in one or more bitrate representations may be pushed to the local cache (block 1106), which may comprise a premises-based local cache, a CDN-based local cache, a mobile network based local cache, etc. A response message is then generated to the client device responsive to the initial content request, the response message including location information of the particular content with respect to the local cache to which the content has been pushed (block 1108).

An example process 1100B executing at a requesting client device (e.g., as a client application interoperating with a streaming media player) may involve the client device or application retrieving the particular content from the local cache based on the response message(s) received from the origin server (block 1120), which is then provided to an associated media player for rendering/display/playback (block 1122). In another embodiment also involving a requesting client, an example process or client application 1100C may involve a discovery process for discovering suitable local caches that may be accessible to the client device (e.g., due to trusted hosting relationships, database sharing arrangements, service level agreements, etc.), prior to generating an initial content request to the origin server for a particular media asset, as set forth at block 1130. Upon locating or otherwise determining one or more suitable local caches, the requesting client device may provide the address information of the local caches, client device's geolocation/network address information, or both, to the origin server as part of or prior to the initial content request (block 1132).

One skilled in the art will recognize that the foregoing blocks, steps and/or acts may be combined, arranged or rearranged in various combinations depending on example network and local cache architectures, as will be set forth in additional detail in the following sections. Turning now to FIG. 1, depicted therein is a block diagram of a network system or architecture 100 according to an embodiment of the present invention. It should be appreciated that the network architecture 100 shown in FIG. 1 is a more generalized aspect of example streaming networks 900 and/or 1000 described hereinabove for purposes of an embodiment of the present invention. The network or system 100 includes a global headend data center 102 containing an origin server 104, a regional headend data center 106 through which content flows from the global headend data center 102 to subscriber home/premises 110. Within the home 110 is a STB or home GW 112 which contains a local cache 114. The client 116 is also within the home; the client 116 may be a TV, laptop, tablet, phone, or other device capable of or configured for rendering content. In one embodiment, the client 116 pairs with the STB/GW 112, for control of the STB or local discovery. In one embodiment, local discovery message 152 includes information about the local cache 114 resident in the STB/GW. In another embodiment, the origin server 104 has a priori knowledge of the local cache 114, based on the operator's knowledge of all connected STB/GW devices. In one embodiment the client 116 provides geolocation information (e.g., latitude, longitude, altitude in some example embodiments) in an initial content request 154, which the origin server 104 correlates to known cache locations (e.g., a lookup or query process) in order to select a proximate local cache 114. In another embodiment, the origin server 104 uses the source address of the client 116 from the initial content request 154, converted to a geolocation, to be correlated with known cache locations in order to select a proximate local cache 114. In one embodiment, when the client 116 wishes to playback content (e.g., a private copy network DVR recording or less popular long-tail content), the client sends a request 154 to the origin server 104, including the local address by which the client 116 may access the local cache 114, the access address by which the origin server 104 may access the local cache 114, or both. In one embodiment, the origin server 104 uses the access address provided by the client 116 in the initial content request 154 to push content via path 156 to the local cache 114. In another embodiment, the origin server 104 uses a priori knowledge of the access address of the local cache 114 to push content 156 to the local cache 114. In another embodiment, the origin server 104 responds to the client 116 initial content request 154 with the location of the content 156 in the local cache 114 using the local address of the local cache 114 provided by the client 116 in the initial content request 154. In yet another embodiment, the origin server 104 responds via path 156 to the client's initial content request 154 with the location of the content in the local cache 114 using an already known local address for the local cache 114. In another embodiment, the origin server 104 may also provide a standard, globally accessible, non-local-cache address (herein referred to as the non-localized address) from which the content may be retrieved. In one embodiment, the non-localized address points to the origin server 104, as noted previously. In another embodiment, the non-localized address points to a global CDN. In one embodiment, the origin server 104 checks the local cache 114 to see if the requested content already exists; if the content already exists, the origin server 104 does not (re)push the content to the local cache 114. In one embodiment, the client 116 may request pre-positioning (e.g., pre-provisioning, in one example arrangement) of content in the local cache 114 by issuing the initial content request 154 sometime prior to actually retrieving the content via a local retrieval path 158. In one embodiment, pre-positioning requests may be queued by the origin server 104, to be processed during times of low bandwidth load so that the content push, e.g., via path 156, has limited impact on overall performance of network 102/106.

In one embodiment, the content being delivered by origin server 104 to client 116 may comprise HTTP adaptive streaming (HAS) media, e.g., HLS, DASH, HDS, HSS, etc. In one embodiment, the origin server 104 generates a manifest file containing URLs that point to the local address of the local cache 114 for the rest of the HAS content. In one embodiment, origin server 104 returns the generated manifest to the client 116, in response to the initial content request 154. In another embodiment, the origin server 104 pushes the generated manifest file with the other manifest files and segments for the HAS media to the local cache 114 as the content 156, and issues an HTTP redirect to the client 116, pointing the client 116 to the generated manifest file using the local address of in the local cache 114. In another embodiment, the origin server 104 generates a manifest file containing relative URLs pointing to the relative location in the local cache 114 of the rest of the HAS content, pushes the generated manifest file with the other manifest files and segments for the HAS media to the local cache 114 as the content 156, and issues an HTTP redirect to the client 116, pointing the client 116 to the generated manifest file using the local address of in the local cache 114. In another embodiment, the origin server 104 responds to the client 116 initial content request 154 with an unmodified manifest file pointing at the non-localized location of the HAS content, along with the local address of the local cache 114. In one embodiment, the client 116 uses the information to generate its own manifest with URLs pointing to the local address of the local cache 114 for the rest of the HAS content. In another embodiment, the client 116 generates a manifest with URLs that point to a local HTTP proxy server (not specifically shown in this FIG.), which may be controlled by the client 116. In one embodiment, upon receiving requests from the media player, the HTTP proxy redirects the player to the local cache 114 location of the content, using the local address returned by the origin server 104. In another embodiment, upon receiving requests from the media player, the HTTP proxy retrieves the content from the local cache 114 using the local address returned by the origin server 104 and returns the content to the media player. In one embodiment, the origin server 104 changes the organizational structure of the manifest and segment files, such that they have different relative paths in the local cache 114 than they do in the non-localized version. In this case, the origin server 104 additionally returns a mapping of content locations to the client 116 in response to the initial content request 154. In one embodiment, the mapping is an explicit mapping for each manifest and segment. In another embodiment, the mapping is a URL template that may be used to construct the actual mapped URLs. Though the description provided applies to HAS media, it should be understood that the same principles may be applied to other forms of multi-file content delivery (e.g., referenced images, scripts, etc. for a Web page).

In one embodiment, the HAS media may comprise live streaming video. In one embodiment, the origin server 104 maintains session state to track the live streaming session. In one embodiment, the origin server 104 queries the local cache 114 to determine if the client 116 is still requesting the content; if not, the origin server 104 may infer that the client 116 has ceased consuming the content. In another embodiment, the origin server 104 may rely on explicit notification from the client 116 that it has ceased consuming the content (e.g., a subsequent request from client 116 for alternate content, or a post of analytics data that signals completion). In one embodiment, while the origin server 104 is operating under the notion that client 116 is still consuming the content, the origin server 104 may continuously push new segment and manifest files to the local cache 114. In one embodiment, the origin server 104 maintains state for all clients 116 playing the same content from the local cache 114, and upon detecting that all clients 116 have ceased consuming the content, may stop pushing new segment and manifest files to the local cache 114. In one embodiment, the origin server 104 may remove older segment and/or manifest files from the local cache 114 to conserve storage resources. In one embodiment, the client 116 may fail to retrieve content from the local cache 114 (e.g., if the client 116 rewound to a point where the files had already been removed or if the origin server 104 failed to push the file in time, or the origin server detected all clients had ceased consuming the content and stopped pushing new files to the local cache 114), the client 116 may attempt to retrieve the content from either the origin server 104 or from the non-localized address provided by the origin server 104, in response to the initial content request 154 (assuming the non-localized address was different from the origin server 104 address).

Figure 2:
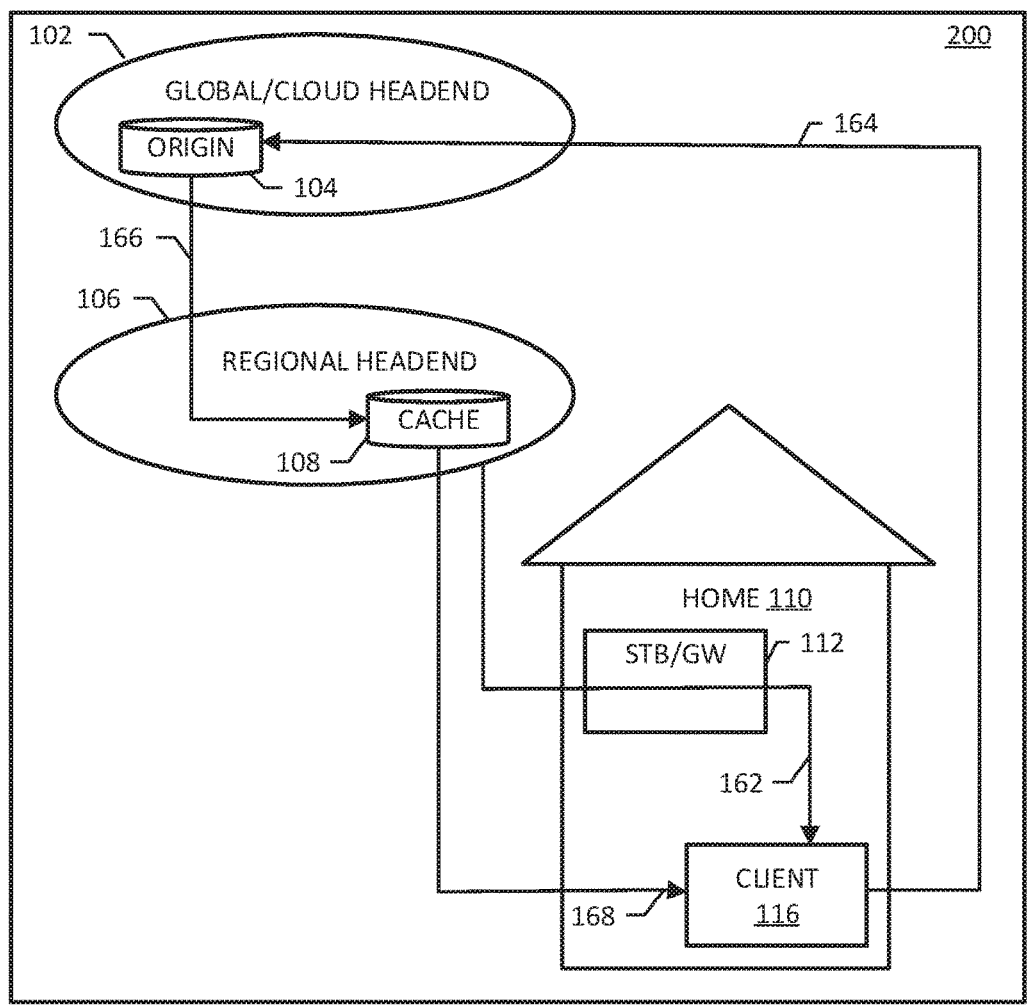
FIG. 2 depicts another block diagram of a system or network environment which may be configured for optimizing personalized media delivery in accordance with one or more embodiments of the invention.

FIG. 2 is a block diagram of a system or network architecture 200 according to another embodiment of the present invention. The network system 200 includes the same global headend data center 102 containing an origin server 104, regional headend data center 106 through which content flows from the global headend data center 102 to the home 110, STB or home GW 112, and client 116 as in FIG. 1. In system 200, the regional headend data center or network 106 also contains a local cache 108. In one embodiment, the local cache 108 is a standalone caching device. In another embodiment, the local cache 108 is a cluster of caching devices with a load balancer or proxy server providing a single interface point to the caches. In one embodiment, the client 116 still pairs with the STB/GW 112, for control of the STB or local discovery. In another embodiment, the operator provides a discovery mechanism for finding local network services. In one embodiment, an operator discovery message includes information about the local cache 108. In another embodiment, the origin server 104 has a priori knowledge of the local cache 108, based on the operator's knowledge of all caching infrastructure in the operator's network. In one embodiment the client 116 provides geolocation information (e.g., latitude, longitude, altitude) in an initial content request 164, which the origin server 104 correlates to known cache locations in order to select a proximate local cache 108. In another embodiment, the origin server 104 uses the source address of the client 116 from the initial content request 164, converted to a geolocation, to be correlated with known cache locations in order to select a proximate local cache 108. In one embodiment, when the client 116 wishes to playback content (e.g., a private copy network DVR recording or less popular long-tail content), the client sends a request 164 to the origin server 104, including the local address by which the client 116 may access the local cache 108, the access address by which the origin server 104 may access the local cache 108, or both. In one embodiment, the origin server 104 uses the access address provided by the client 116 in the initial content request 164 to push content 166 to the local cache 108. In another embodiment, the origin server 104 uses a priori knowledge of the access address of the local cache 108 to push content 166 to the local cache 108. In one embodiment, the origin server 104 responds to the client 116 initial content request 164 with the location of the content 166 in the local cache 108 using the local address of the local cache 108 provided by the client 116 in the initial content request 164. In another embodiment, the origin server 104 responds to the client 116 initial content request 164 with the location of the content 166 in the local cache 108 using an already known local address for the local cache 108. In one embodiment, the origin server 104 also provides the standard, globally accessible, non-local-cache address (herein referred to as the non-localized address) from which the content may be retrieved. In one embodiment, the non-localized address points to the origin server 104. In another embodiment, the non-localized address points to a global CDN. In one embodiment, the origin server 104 checks the local cache 108 to see if the content 166 already exists; if the content 166 already exists, the origin server 104 does not repush the content to the local cache 108. In one embodiment, the client 116 may request pre-positioning of content in the local cache 108 by issuing the initial content request 164 sometime prior to actually retrieving the content 168. In one embodiment, pre-positioning requests may be queued by the origin server 104, to be processed during times of low bandwidth load so that the content push 166 has limited impact on overall performance of the networks 102 and/or 106.

As before, the content being delivered by origin server 104 to client 116 may comprise HTTP adaptive streaming (HAS) media, e.g., HLS, DASH, HDS, HSS, etc. In one embodiment, the origin server 104 generates a manifest file containing URLs that point to the local address of the local cache 108 for the rest of the HAS content. In one embodiment, origin server 104 returns the generated manifest to the client 116, in response to the initial content request 164. In another embodiment, the origin server 104 pushes the generated manifest file with the other manifest files and segments for the HAS media to the local cache 108 as the content 166, and issues an HTTP redirect to the client 116, pointing the client 116 to the generated manifest file using the local address of in the local cache 108. In another embodiment, the origin server generates a manifest file containing relative URLs pointing to the relative location in the local cache 108 of the rest of the HAS content, pushes the generated manifest file with the other manifest files and segments for the HAS media to the local cache 108 as the content 166, and issues an HTTP redirect to the client 116, pointing the client 116 to the generated manifest file using the local address of in the local cache 108. In another embodiment, the origin server 104 responds to the client 116 initial content request 164 with an unmodified manifest file pointing at the non-localized location of the HAS content, along with the local address of the local cache 108. In one embodiment, the client 116 uses the information to generate its own manifest with URLs pointing to the local address of the local cache 108 for the rest of the HAS content. In another embodiment, the client 116 generates a manifest with URLs that point to a local HTTP proxy server controlled by the client 116. In one embodiment, upon receiving requests from the media player, the HTTP proxy redirects the player to the local cache 108 location of the content, using the local address returned by the origin server 104. In another embodiment, upon receiving requests from the media player, the HTTP proxy retrieves the content from the local cache 108 using the local address returned by the origin server 104 and returns the content to the media player. In one embodiment, the origin server 104 changes the organizational structure of the manifest and segment files, such that they have different relative paths in the local cache 108 than they do in the non-localized version. In this case, the origin server 104 additionally returns a mapping of content locations to the client 116 in response to the initial content request 164. In one embodiment, the mapping is an explicit mapping for each manifest and segment. In another embodiment, the mapping is a URL template that may be used to construct the actual mapped URLs. Though the description provided applies to HAS media, it should be understood that the same principles may be applied to other forms of multi-file content delivery (e.g., referenced images, scripts, etc. for a Web page).

In one embodiment, the HAS media is live streaming video. In one embodiment, the origin server 104 maintains session state to track the live streaming session. In one embodiment, the origin server 104 queries the local cache 108 to determine if the client 116 is still requesting the content; if not, the origin server 104 may infer that the client 116 has ceased consuming the content. In another embodiment, the origin server 104 may rely on explicit notification from the client 116 that it has ceased consuming the content (e.g., a subsequent request from client 116 for alternate content, or a post of analytics data signaling completion). In one embodiment, while the origin server 104 is operating under the notion that client 116 is still consuming the content, the origin server 104 may continuously push new segment and manifest files to the local cache 108. In one embodiment, the origin server 104 maintains state for all clients 116 playing the same content from the local cache 108, and upon detecting that all clients 116 have ceased consuming the content, may stop pushing new segment and manifest files to the local cache 108. In one embodiment, the origin server 104 may remove older segment and/or manifest files from the local cache 108 to conserve storage resources. In one embodiment, the client 116 may fail to retrieve content from the local cache 108 (e.g., if the client 116 rewound to a point where the files had already been removed or if the origin server 104 failed to push the file in time, or the origin server detected all clients had ceased consuming the content and stopped pushing new files to the local cache 108), the client 116 may attempt to retrieve the content from either the origin server 104 or from the non-localized address provided by the origin server 104, in response to the initial content request 164 (assuming the non-localized address was different from the origin server 104 address).

Figure 3:
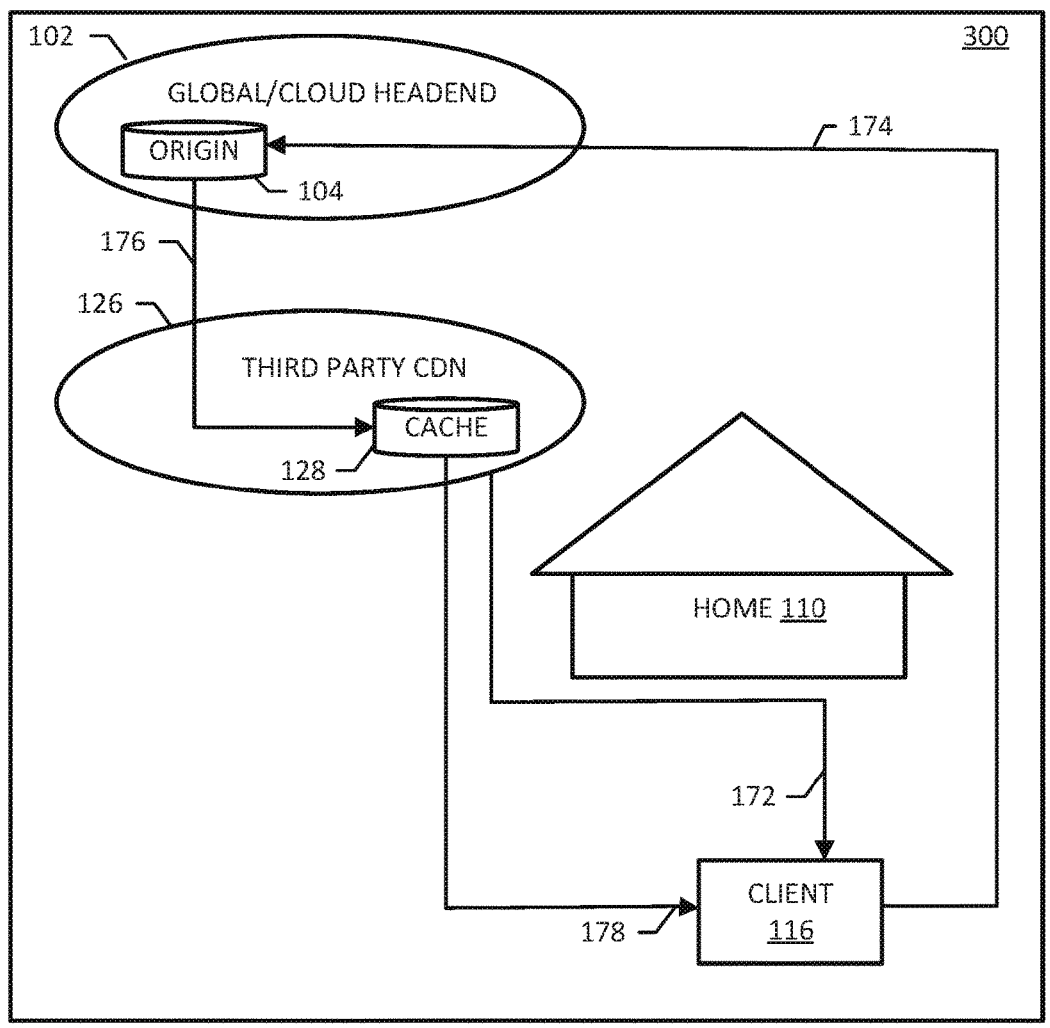
FIG. 3 depicts a block diagram of a system or network environment which may be configured to optimizing personalized media delivery for nomadic cloud delivery in accordance with one or more embodiments of the invention.

FIG. 3 is a block diagram of a system 300 for one embodiment of the present invention. The system includes the same global headend data center 102 containing an origin server 104, home 110, and client 116 as in FIG. 1. In system 300, the client 116 is no longer in the home 110. The client 116 has left the home and is now roaming in a remote location that the operator's footprint does not cover. In one embodiment, the operator works with third party CDN operators 126 to increase coverage for nomadic clients 116. Each CDN 126 may contain one or more local caches 128. In one embodiment, a local cache 128 is a standalone caching device. In another embodiment, a local cache 128 is a cluster of caching devices with a load balancer or proxy server providing a single interface point to the caches. In one embodiment, the CDN operator provides a discovery mechanism for finding local network services. In one embodiment, operator discovery message 174 includes information about the local cache 128. In another embodiment, the origin server 104 has a priori knowledge of the local cache 128, based on the operator's CDN federation agreements with the CDN 126. In one embodiment the client 116 provides geolocation information (e.g., latitude, longitude, altitude) in the initial content request 174, which the origin server 104 correlates to known cache locations in order to select a proximate local cache 128. In another embodiment, the origin server 104 uses the source address of the client 116 from the initial content request 174, converted to a geolocation, to be correlated with known cache locations in order to select a proximate local cache 128. In one embodiment, when the client 116 wishes to playback content (e.g., a private copy network DVR recording or less popular long-tail content), the client sends a request 174 to the origin server 104, including the local address by which the client 116 may access the local cache 128, the access address by which the origin server 104 may access the local cache 128, or both. In one embodiment, the origin server 104 uses the access address provided by the client 116 in the initial content request 174 to push content 176 to the local cache 128. In another embodiment, the origin server 104 uses a priori knowledge of the access address of the local cache 128 to push content 176 to the local cache 128. In one embodiment, the origin server 104 responds to the client 116 initial content request 174 with the location of the content 176 in the local cache 128 using the local address of the local cache 128 provided by the client 116 in the initial content request 174. In another embodiment, the origin server 104 responds to the client 116 initial content request 174 with the location of the content 176 in the local cache 128 using an already known local address for the local cache 128. In one embodiment, the origin server 104 also provides the standard, globally accessible, non-local-cache address (herein referred to as the non-localized address) from which the content may be retrieved. In one embodiment, the non-localized address points to the origin server 104. In another embodiment, the non-localized address points to a global CDN. In one embodiment, the origin server 104 checks the local cache 128 to see if the content 176 already exists; if the content 176 already exists, the origin server 104 does not repush the content to the local cache 128. In one embodiment, the client 116 may request pre-positioning of content in the local cache 128 by issuing the initial content request 174 sometime prior to actually retrieving the content via retrieval path 178. In one embodiment, pre-positioning requests may be queued by the origin server 104, to be processed during times of low bandwidth load so that the content push 176 has limited impact on overall performance of networks 102 and/or 106.

As before, the content being delivered by origin server 104 to client 116 may comprise HTTP adaptive streaming (HAS) media, e.g., HLS, DASH, HDS, HSS, wherein the origin server 104 generates a manifest file containing URLs that point to the local address of the local cache 128 for the rest of the HAS content. In one embodiment, origin server 104 returns the generated manifest to the client 116, in response to the initial content request 174. In another embodiment, the origin server 104 pushes the generated manifest file with the other manifest files and segments for the HAS media to the local cache 128 as the content 176, and issues an HTTP redirect to the client 116, pointing the client 116 to the generated manifest file using the local address of in the local cache 128. In another embodiment, the origin server generates a manifest file containing relative URLs pointing to the relative location in the local cache 128 of the rest of the HAS content, pushes the generated manifest file with the other manifest files and segments for the HAS media to the local cache 128 as the content 176, and issues an HTTP redirect to the client 116, pointing the client 116 to the generated manifest file using the local address of in the local cache 128. In another embodiment, the origin server 104 responds to the client 116 initial content request 174 with an unmodified manifest file pointing at the non-localized location of the HAS content, along with the local address of the local cache 128. In one embodiment, the client 116 uses the information to generate its own manifest with URLs pointing to the local address of the local cache 128 for the rest of the HAS content. In another embodiment, the client 116 generates a manifest with URLs that point to a local HTTP proxy server controlled by the client 116. In one embodiment, upon receiving requests from the media player, the HTTP proxy redirects the player to the local cache 128 location of the content, using the local address returned by the origin server 104. In another embodiment, upon receiving requests from the media player, the HTTP proxy retrieves the content from the local cache 128 using the local address returned by the origin server 104 and returns the content to the media player. In one embodiment, the origin server 104 changes the organizational structure of the manifest and segment files, such that they have different relative paths in the local cache 128 than they do in the non-localized version. In this case, the origin server 104 additionally returns a mapping of content locations to the client 116 in response to the initial content request 174. In one embodiment, the mapping is an explicit mapping for each manifest and segment. In another embodiment, the mapping is a URL template that may be used to construct the actual mapped URLs. Though the description provided applies to HAS media, it should be understood that the same principles may be applied to other forms of multi-file content delivery (e.g., referenced images, scripts, etc. for a Web page).

Where the HAS media comprises live streaming video, the origin server 104 maintains session state to track the live streaming session, as described before. Accordingly, in one embodiment, the origin server 104 queries the local cache 128 of the CDN 126 to determine if the client 116 is still requesting the content; if not, the origin server 104 may infer or otherwise determine that the client 116 has ceased consuming the content. In another embodiment, the origin server 104 may rely on explicit notification from the client 116 that it has ceased consuming the content (e.g., a subsequent request from client 116 for alternate content, or a post of analytics data signaling completion). In one embodiment, while the origin server 104 is operating under the notion that client 116 is still consuming the content, the origin server 104 may continuously push new segment and manifest files to the local cache 128. In one embodiment, the origin server 104 maintains state for all clients 116 playing the same content from the local cache 128, and upon detecting that all clients 116 have ceased consuming the content, may stop pushing new segment and manifest files to the local cache 128. In one embodiment, the origin server 104 may remove older segment and/or manifest files from the local cache 128 to conserve storage resources. In one embodiment, the client 116 may fail to retrieve content from the local cache 128 (e.g., if the client 116 rewound to a point where the files had already been removed or if the origin server 104 failed to push the file in time, or the origin server detected all clients had ceased consuming the content and stopped pushing new files to the local cache 128), the client 116 may attempt to retrieve the content from either the origin server 104 or from the non-localized address provided by the origin server 104, in response to the initial content request 174 (assuming the non-localized address was different from the origin server 104 address).

Figure 4:
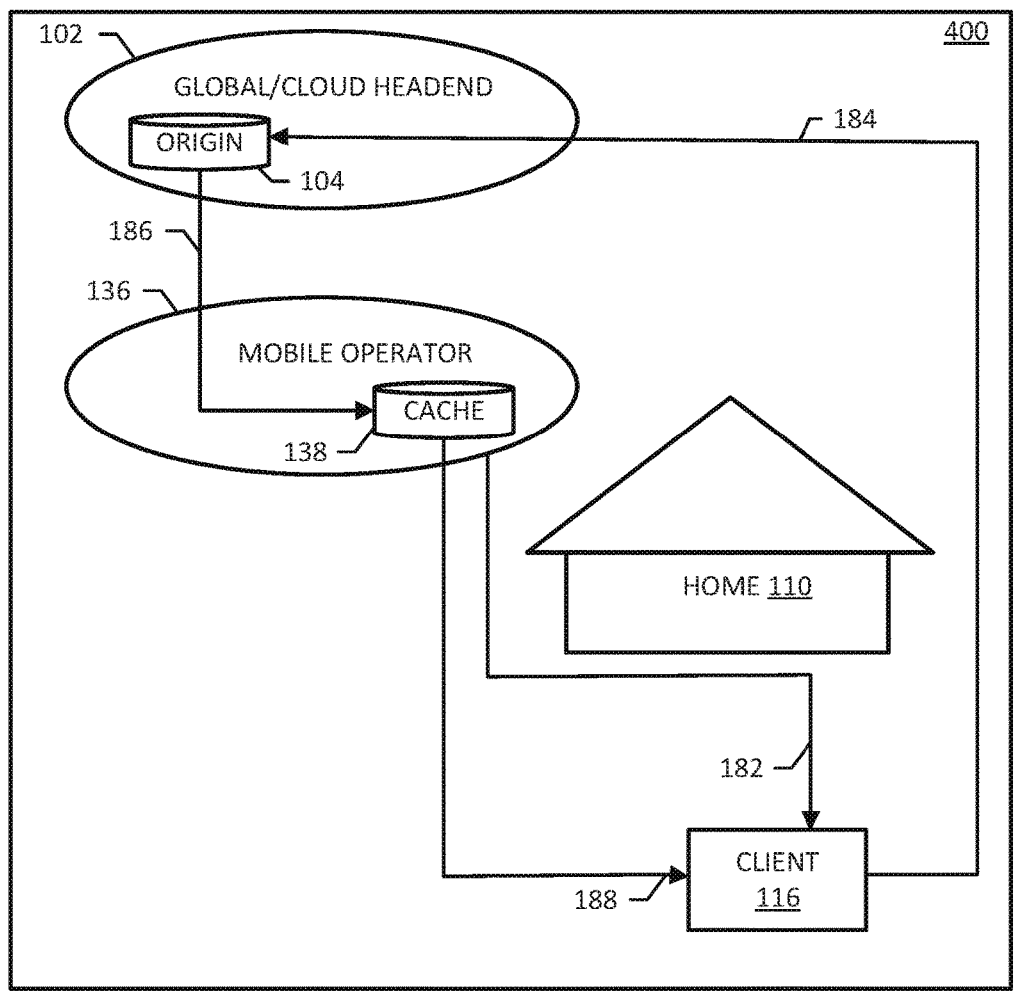
FIG. 4 depicts another block diagram of a system or network environment which may be configured for optimizing personalized media delivery for nomadic cloud delivery in accordance with one or more embodiments of the invention.

FIG. 4 is a block diagram of a system 400 for one embodiment of the present invention. The system includes the same global headend data center 102 containing an origin server 104, home 110, and client 116 as in FIG. 1. In system 400, the client 116 is no longer in the home 110, similar to the embodiment shown in FIG. 3. The client 116 has left the home and is now connected to a mobile/cellular network 136 which contains a local cache 138. Initial content request messaging, local cache discovery processes, retrieval of requested data from the local cache, etc., set forth hereinabove with respect to FIG. 3 are therefore equally applicable here, mutatis mutandis. In one embodiment, the local cache 138 is a standalone caching device. In another embodiment, the local cache 138 is a cluster of caching devices with a load balancer or proxy server providing a single interface point to the caches. In one embodiment, the mobile/cellular network operator provides a discovery mechanism for finding local network services. In one embodiment, operator discovery message 184 includes information about the local cache 138. In another embodiment, the origin server 104 has a priori knowledge of the local cache 138, based on the operator's peering agreements with the mobile/cellular network 136. In one embodiment the client 116 provides geolocation information (e.g., latitude, longitude, altitude) in the initial content request 184, which the origin server 104 correlates to known cache locations in order to select a proximate local cache 138. In another embodiment, the origin server 104 uses the source address of the client 116 from the initial content request 184, converted to a geolocation, to be correlated with known cache locations in order to select a proximate local cache 138. In one embodiment, when the client 116 wishes to playback content (e.g., a private copy network DVR recording or less popular long-tail content), the client sends a request 184 to the origin server 104, including the local address by which the client 116 may access the local cache 138, the access address by which the origin server 104 may access the local cache 138, or both. In one embodiment, the origin server 104 uses the access address provided by the client 116 in the initial content request 184 to push content 186 to the local cache 138. In another embodiment, the origin server 104 uses a priori knowledge of the access address of the local cache 138 to push content 186 to the local cache 138. In one embodiment, the origin server 104 responds to the client 116 initial content request 184 with the location of the content 186 in the local cache 138 using the local address of the local cache 138 provided by the client 116 in the initial content request 184. In another embodiment, the origin server 104 responds to the client 116 initial content request 184 with the location of the content 186 in the local cache 138 using an already known local address for the local cache 138. In one embodiment, the origin server 104 also provides the standard, globally accessible, non-local-cache address (herein referred to as the non-localized address) from which the content may be retrieved. In one embodiment, the non-localized address points to the origin server 104. In another embodiment, the non-localized address points to a global CDN. In one embodiment, the origin server 104 checks the local cache 138 to see if the content 186 already exists; if the content 186 already exists, the origin server 104 does not repush the content to the local cache 138. In one embodiment, the client 116 may request pre-positioning of content in the local cache 138 by issuing the initial content request 184 sometime prior to actually retrieving the content 188. In one embodiment, pre-positioning requests may be queued by the origin server 104, to be processed during times of low bandwidth load so that the content push 186 has limited impact on overall network 102/136 performance.

As set forth previously, the content being delivered by origin server 104 to client 116 may comprise HAS media content. In one embodiment, the origin server 104 generates a manifest file containing URLs that point to the local address of the local cache 138 for the rest of the HAS content. In one embodiment, origin server 104 returns the generated manifest to the client 116, in response to the initial content request 184. In another embodiment, the origin server 104 pushes the generated manifest file with the other manifest files and segments for the HAS media to the local cache 138 as the content 186, and issues an HTTP redirect to the client 116, pointing the client 116 to the generated manifest file using the local address of in the local cache 138. In another embodiment, the origin server generates a manifest file containing relative URLs pointing to the relative location in the local cache 138 of the rest of the HAS content, pushes the generated manifest file with the other manifest files and segments for the HAS media to the local cache 138 as the content 186, and issues an HTTP redirect to the client 116, pointing the client 116 to the generated manifest file using the local address of in the local cache 138. In another embodiment, the origin server 104 responds to the client 116 initial content request 184 with an unmodified manifest file pointing at the non-localized location of the HAS content, along with the local address of the local cache 138. In one embodiment, the client 116 uses the information to generate its own manifest with URLs pointing to the local address of the local cache 138 for the rest of the HAS content. In another embodiment, the client 116 generates a manifest with URLs that point to a local HTTP proxy server controlled by the client 116. In one embodiment, upon receiving requests from the media player, the HTTP proxy redirects the player to the local cache 138 location of the content, using the local address returned by the origin server 104. In another embodiment, upon receiving requests from the media player, the HTTP proxy retrieves the content from the local cache 138 using the local address returned by the origin server 104 and returns the content to the media player. In one embodiment, the origin server 104 changes the organizational structure of the manifest and segment files, such that they have different relative paths in the local cache 138 than they do in the non-localized version. In this case, the origin server 104 additionally returns a mapping of content locations to the client 116 in response to the initial content request 184. In one embodiment, the mapping is an explicit mapping for each manifest and segment. In another embodiment, the mapping is a URL template that may be used to construct the actual mapped URLs. Though the description provided applies to HAS media, it should be understood that the same principles may be applied to other forms of multi-file content delivery (e.g., referenced images, scripts, etc. for a Web page).

Again, where the requested HAS media is live streaming video, the origin server 104 maintains session state to track the live streaming session. In one embodiment, the origin server 104 queries the local cache 138 to determine if the client 116 is still requesting the content; if not, the origin server 104 may infer that the client 116 has ceased consuming the content. In another embodiment, the origin server 104 may rely on explicit notification from the client 116 that it has ceased consuming the content (e.g., a subsequent request from client 116 for alternate content, or a post of analytics data signaling completion). In one embodiment, while the origin server 104 is operating under the notion that client 116 is still consuming the content, the origin server 104 may continuously push new segment and manifest files to the local cache 138. In one embodiment, the origin server 104 maintains state for all clients 116 playing the same content from the local cache 138, and upon detecting that all clients 116 have ceased consuming the content, may stop pushing new segment and manifest files to the local cache 138. In one embodiment, the origin server 104 may remove older segment and/or manifest files from the local cache 138 to conserve storage resources. In one embodiment, the client 116 may fail to retrieve content from the local cache 138 (e.g., if the client 116 rewound to a point where the files had already been removed or if the origin server 104 failed to push the file in time, or the origin server detected all clients had ceased consuming the content and stopped pushing new files to the local cache 138), the client 116 may attempt to retrieve the content from either the origin server 104 or from the non-localized address provided by the origin server 104, in response to the initial content request 184 (assuming the non-localized address was different from the origin server 104 address).

A skilled artisan will recognize upon reference hereto that the various local cache discovery messages, initial content request messages, device location information messages, etc., set forth in the embodiments of FIGS. 1-4 may be combined or consolidated in a number of message combinations or generated separately (e.g., at different times) by a UE device for purposes of an embodiment of the present application. Likewise, response messages from the origin server may also represent or contain different pieces of information, media content data, manifest file information, cache address information, etc., depending on a specific implementation.

Figure 5:
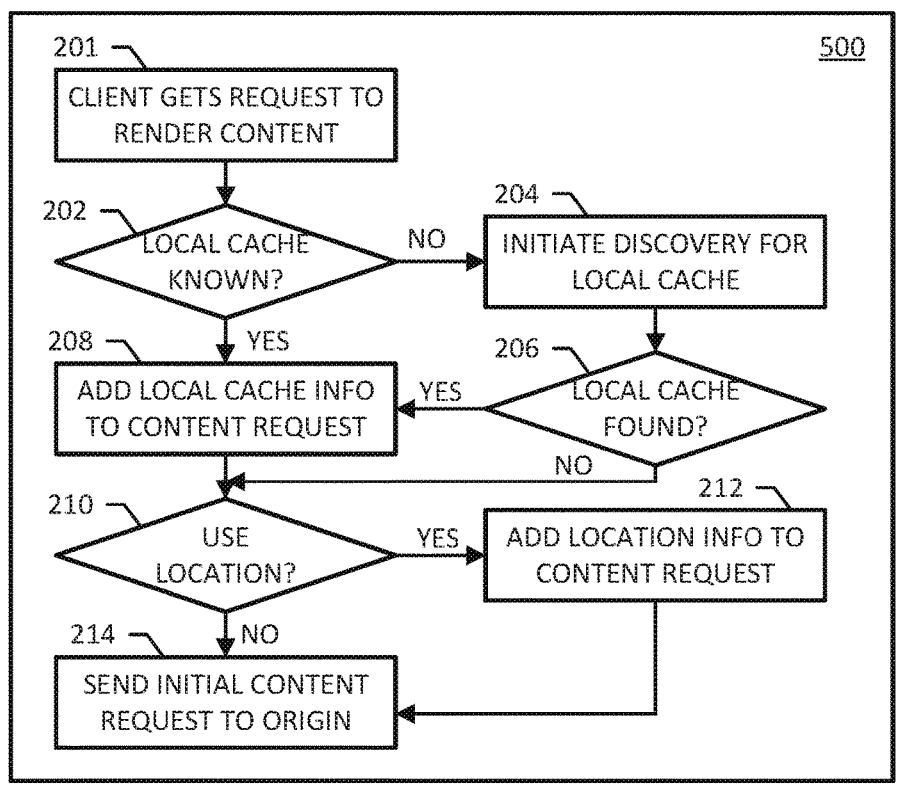
FIG. 5 is a flowchart showing various steps, blocks or acts of a method for facilitating optimized media delivery in accordance with an embodiment of the present invention.

FIG. 5 is a flowchart of various steps, blocks and/or acts of an example a process 500 that may be performed by client 116 for initiating optimized retrieval of content from origin server 104. The process begins in step 201 where the client 116 receives a request to render content (e.g., a user pressing the play button for a video or a user or script requesting a Web page). In step 202, the client 116 checks to see if a local cache 114/108/128/138 has already been discovered and is still valid (i.e., accessible). If a local cache 114/108/128/138 is already known and available, processing proceeds to step 208; otherwise processing proceeds to step 204 where the client 116 initiates discovery for a local cache 114/108/128/138. In one embodiment, the client 116 waits until the first content rendering request to initiate discovery. In another embodiment, the client 116 may initiate discovery as soon as it comes online or joins a new network. Though step 204 is shown here as a consequence of or in response to a content rendering request, it should be understood that discovery may be initiated at any time prior to actual content rendering, as long as the local cache 114/108/128/138 is found valid in process step 202. In one embodiment, discovery may include pairing with a STB/GW 112. In another embodiment, discovery may be accomplished by a priori knowledge of mobile or CDN network partners 136/126. In another embodiment, a network operator 102/106/126/136 may provide a proprietary API for discovery of a local cache 114/108/128/138. In another embodiment, a standard service discovery protocol, e.g., UPnP, SSDP, Bonjour, WS-Discovery, UDDI, etc., may be used to discover the local cache 114/108/128/138. There are many network service discovery protocols suitable for discovering a local caching service, as should be known to those skilled in the art; the methods described herein are compatible with all such service discovery protocols, including any proprietary protocols. From step 204, processing proceeds to step 206 where client 116 checks to see if a local cache 114/108/128/138 was found. If no local cache 114/108/128/138 was found, processing continues to step 210. If a local cache 114/108/128/138 was found, processing continues to step 208 where the local cache 114/108/128/138 information is compiled and added to the initial content request 154/164/174/184. In one embodiment, the local cache 114/108/128/138 information includes the local address from which the client 116 can reach the local cache 114/108/128/138 and the externally accessible access address from which the origin server 104 can reach the local cache 114/108/128/138 (understanding that if the local cache 114/108/128/138 resides in a NAT'd domain (e.g., a domain after Network Address Translation), the two addresses may be different). In one embodiment, the local cache 114/108/128/138 information also includes authentication, authorization, and/or billing information, as well as information about the operator 102/106/126/136 who owns the local cache 114/108/128/138. Once the local cache 114/108/128/138 information is compiled, processing proceeds to step 210 where the client 116 checks to see if location information is available and allowed for use (understanding that the use of available location information, e.g., latitude/longitude/altitude, may be restricted for privacy reasons in certain implementations). If location information is either unavailable or not allowed for use, processing proceeds directly to step 214. If location information is available and allowed for use, processing proceeds to step 212 where the location information is added to the initial content request 154/164/174/184, before continuing on to step 214. In step 214, the client 116 sends the initial content request 154/164/174/184 to the origin server 104, including any local cache 114/108/128/138 and/or location information compiled throughout process 500.

Figure 6:
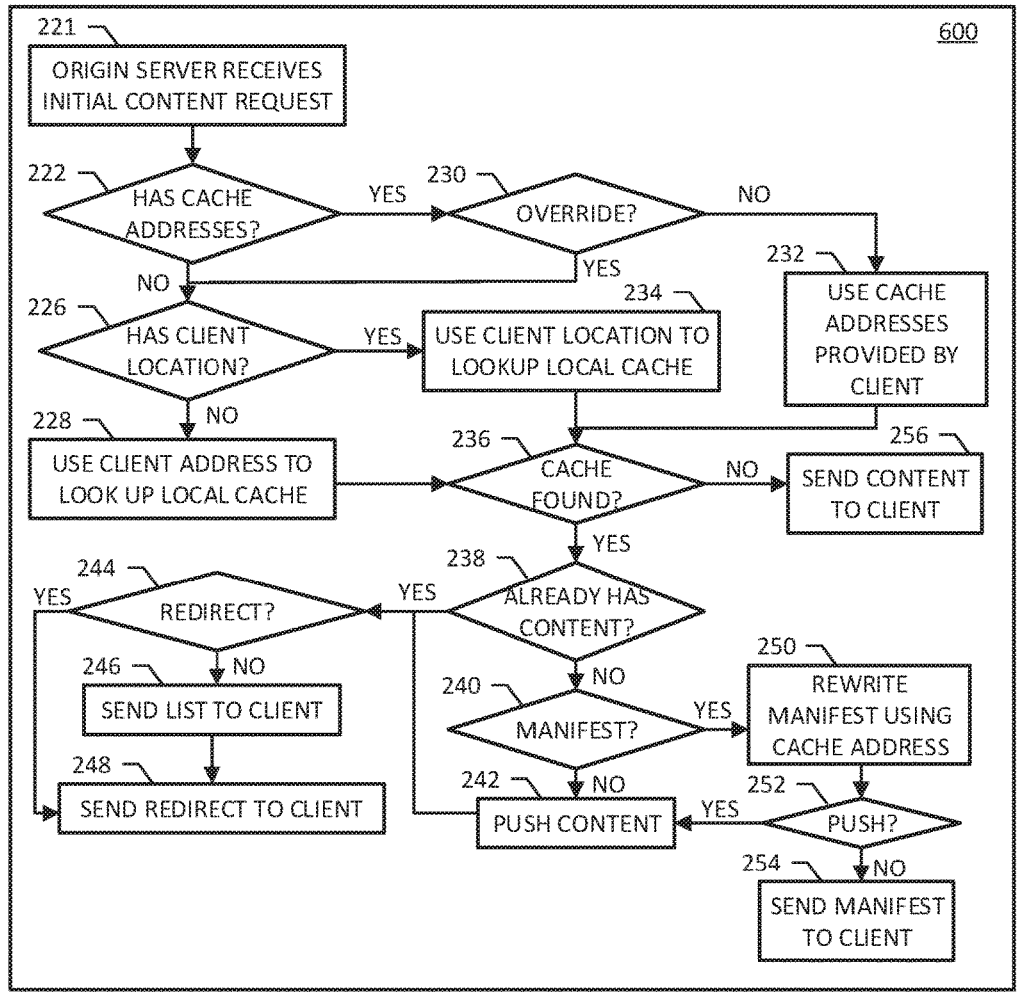
FIG. 6 is a flowchart showing various steps, blocks or acts of a method for facilitating optimized media delivery in accordance with an embodiment of the present invention.

FIG. 6 is a flowchart of various steps, blocks and/or acts of an example process 600 that may be performed by origin server 104 for optimizing delivery of content to client 116 according to an embodiment. The process begins in step 221 when the origin server 104 receives an initial content request 154/164/174/184 from a client 116, as set forth in step 214 of process 500 described above. In step 222, the origin server 104 first checks to see if the client 116 has included information about a discovered local cache 114/108/128/138. If the client 116 did not include discovered local cache 114/108/128/138 information, processing proceeds directly to step 226. If the client 116 did include discovered local cache 114/108/128/138 information, processing continues to step 230 where the origin server 104 checks to see if it would like to override the local cache 114/108/128/138 selection made by the client 116. In one embodiment, the origin server 104 may prefer to use only cache(s) owned and operated by itself or close partners, in order to limit the impact of delivery charges. In another embodiment, the origin server 104 may keep a blacklist of known bad or unsafe caches, e.g., caches with historically poor performance or security. In another embodiment, the origin server 104 may keep detailed real-time statistics on cache performance and may be able to choose a more optimal cache for the client 116. There are numerous reasons why origin server 104 might want to override the local cache 114/108/128/138 selection made by the client 116, as should be known to those skilled in the art; it should be understood that any of these reasons would be acceptable in step 230. If override is not allowed or not warranted, processing proceeds to step 232 where the address information provided by the client is used to check the accessibility of the local cache 114/108/128/138 by the origin server 104. If override is allowed and desired, processing continues to step 226 where the origin server 104 checks to see if the client 116 has included location information in the initial content request 154/164/174/184. If location information was provided by the client 116, processing continues to step 234 where the location information is used to lookup a local cache 114/108/128/138 and check for accessibility by the origin server 104. If location information was not provided by the client 116, processing continues to step 228 where the client 116 source address information from the initial content request 154/164/174/184 information is used to lookup a local cache 114/108/128/138 and check for accessibility by the origin server 104. Processing continues from steps 232, 228, and 234 to step 236 where the origin server 104 checks to see if a local cache 114/108/128/138 was found. If no local cache 114/108/128/138 was found, processing continues to step 256 where the requested content is returned to the client 116. If a local cache 114/108/128/138 was found, then processing proceeds directly to step 238 where the origin server 104 checks to see if the content begin request already exists in the selected local cache 114/108/128/138. If the content already exists in the local cache 114/108/128/138, processing proceeds to step 244. If the content does not yet exist in the local cache, processing continues to step 240 where the origin server 104 checks to see if the content being requested is HAS content, and the initial content request 154/164/174/184 is seeking a manifest file. If the initial content request 154/164/174/184 was not for a HAS manifest file, the content is pushed to the local cache 114/108/128/138 in step 242 and processing proceeds to step 244. If the initial content request 154/164/174/184 was for a HAS manifest file, processing continues to step 250 where the origin server 104 may execute different processes depending on implementation, e.g., (i) rewrite the manifest file and return it to the client; or (ii) return the unmodified manifest file, e.g., having local and non-local addresses, to the client. It should be noted that in one or more example embodiments of FIGS. 1-4 discussed above, the origin server can send back an unmodified manifest and let the http proxy server of the client to rewrite it. Accordingly, in one arrangement, the manifest file may contain the local address of caches from which the client 116 can retrieve the content, e.g., local cache 114/108/128/138, as set forth in FIGS. 1-4. Furthermore, processing may then continue to step 252 in one arrangement where the origin server 104 may be configured to determine whether it would like the client 116 to retrieve the updated manifest file from the local cache 114/108/128/138, or whether it wants to return the updated manifest file directly to the client 116. If the origin server 104 chooses to return the updated manifest file to the client 116, then processing proceeds to step 254 where the updated manifest file is sent to the client 116. Otherwise processing continues to step 242 were the content is pushed to the local cache 114/108/128/138 in step 242 before proceeding to step 244. In step 244, the origin server 104 decides whether to send a redirect message or a list of available files to the client 116. If the origin server 104 decides to send a redirect message, processing proceeds to step 248 where a redirect message, pointing at the pushed file in the local cache 114/108/128/138, using the local address from which the client 116 may access the local cache 114/108/128/138, is sent to the client 116. If the origin server 104 decides to send a list of available files, processing proceeds to step 246 where the list of available files is compiled and sent to the client 116. In one embodiment, the origin server 104 may be configured to anticipate subsequent requests from the client 116 for related files and wish to send the client 116 a list of related files that are also available from the local cache 114/108/128/138. In another embodiment, the origin server 104 may detect that the client 116 does not support parsing a list of available related files and may decide to just redirect the client 116 to the file requested in the initial content request 154/164/174/184. Accordingly, at least a portion of the steps, blocks and/or acts set forth in FIG. 6 may be rearranged and/or modified in multiple configurations.

Figure 7:
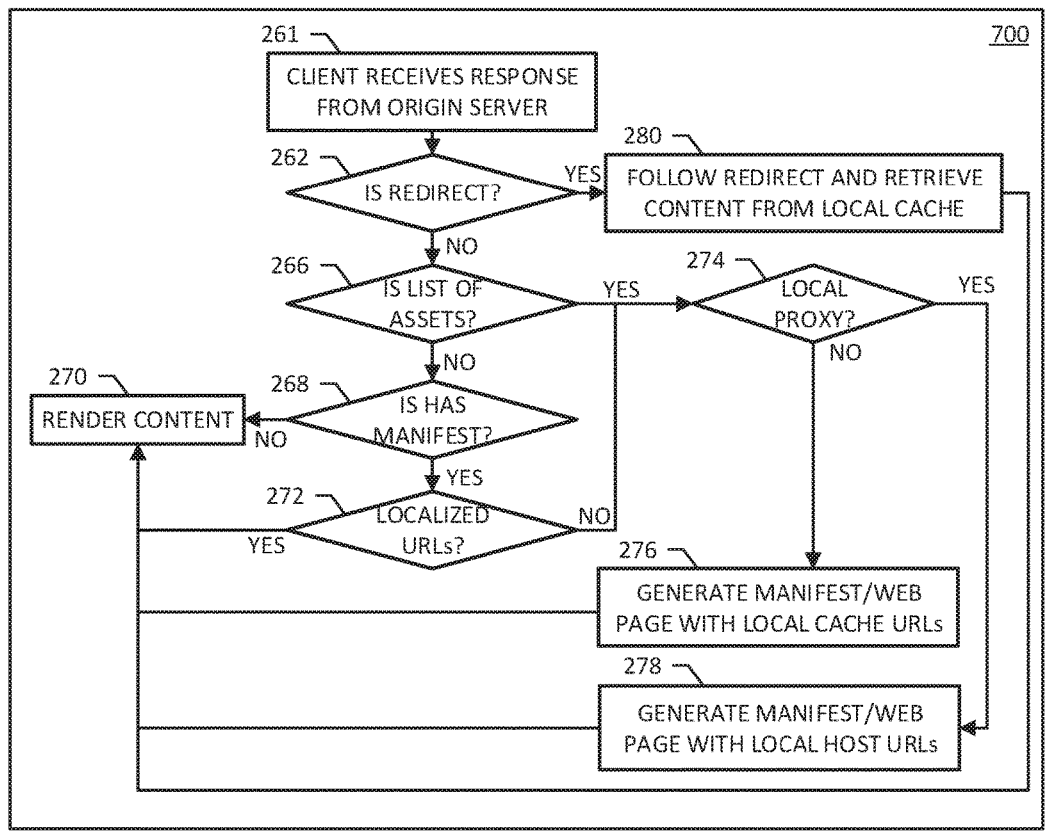
FIG. 7 is a flowchart showing various steps, blocks or acts of a method for facilitating optimized media delivery in accordance with an embodiment of the present invention.

FIG. 7 is a flowchart of various steps, blocks and/or acts of an example process 700 performed by client 116 for optimizing content retrieval, specifically optimizing HAS media delivery responsive to receiving suitable response message(s) from an origin server, according to an embodiment of the present invention. The process 700 begins at step 261 where the client 116 receives a response to an initial content request 154/164/174/184 from the origin server 104, as sent by steps 246, 248, 254, or 256 of process 600 described above. In step 262, the client 116 first checks to see if the response from the origin server 104 is a redirect (e.g., HTTP 302 response). If the response is a redirect, as generated by step 248 of process 600, processing continues to step 280 where the client 116 follows the redirect and retrieves the content from the local cache 114/108/128/138 for rendering (block 270). If the response was not a redirect, processing continues to step 266 where the client 116 checks to see if the response is a list of assets. If the response was a list of assets, processing proceeds to step 274. If the response was not a list of assets, processing proceeds to step 268 where the client 116 checks to see if the response is a HAS media manifest file (e.g., HLS m3u8 file, DASH MPD file, etc.). If the response was not a HAS media manifest file, processing proceeds directly to step 270 where the response content is rendered. If the response was a HAS media manifest file, processing continues to step 272 where the client 116 checks to see if the manifest contains URLs that point to the local cache 114/108/128/138. If the HAS media manifest file contains URLs that point to the local cache 114/108/128/138, processing continues to step 270 where the response content is rendered (i.e., the manifest is presented to the media player). If the HAS media manifest file does not contain URLs that point to the local cache 114/108/128/138, processing proceeds to step 274. In step 274, the client 116 decides if it would like to use a local HTTP proxy server to deliver the HAS media or asset collection to the renderer. If the client 116 chooses to go with an HTTP proxy approach, processing continues to step 278 where the client 116 generates a HAS manifest file or Web page using localhost addresses pointing at the HTTP proxy server, which is then presented for rendering in step 270. In one arrangement, the local cache and/or non-localized URLs may be stored for subsequent use in redirecting the media renderer. If the client 116 chooses not to go with an HTTP proxy approach, processing continues to step 276 where the client 116 generates a HAS manifest file or Web page using the local address of the local cache 114/108/128/138, which is then presented for rendering in step 270.

Skilled artisans will recognize that at least a portion of the various steps, blocks and/or acts set forth in FIGS. 5-7 may be (re)combined, modified, and/or (re)arranged into particular implementations of example embodiments of processes/sub-processes illustrated in FIGS. 11A-11C described hereinabove.

Figure 8:
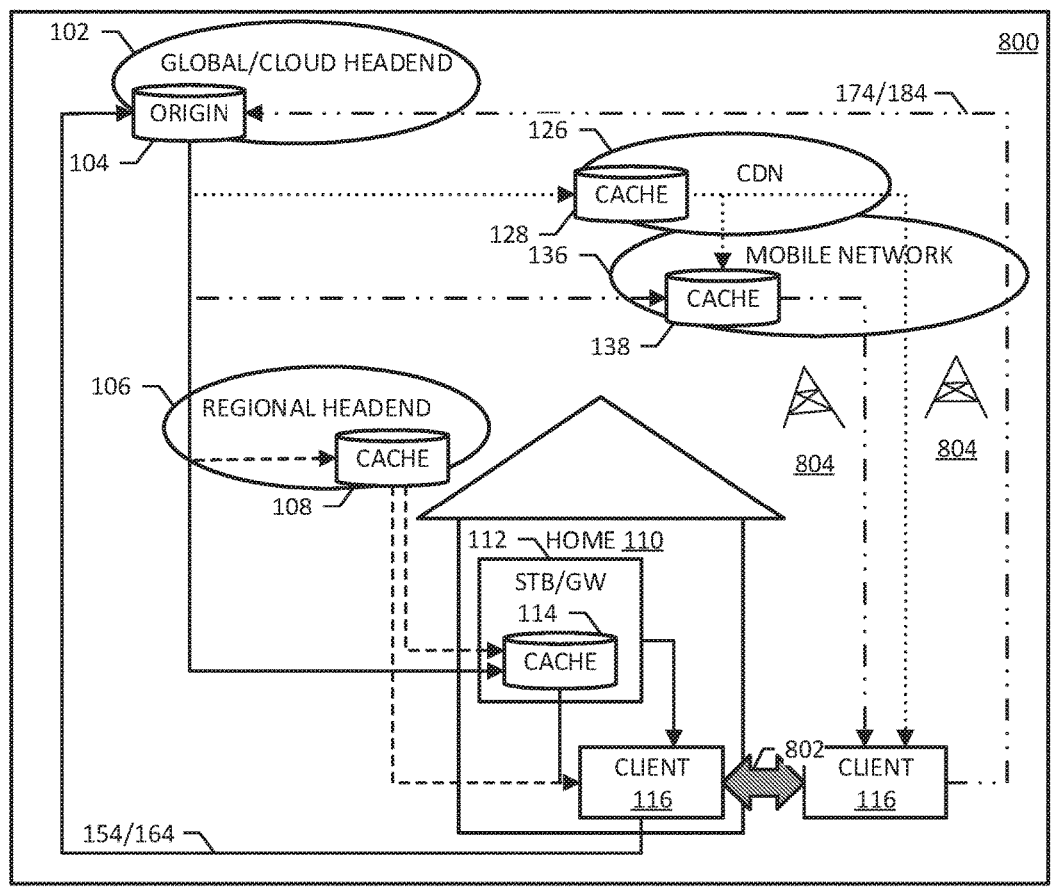
FIG. 8 depicts another block diagram of a system or network architecture may be configured for optimizing personalized media delivery for nomadic cloud delivery in a mobility environment according to one or more embodiments of the invention.

Turning now to FIG. 8, depicted therein is a block diagram of a network architecture or system 800 that includes both wired network and wireless/mobile networks for facilitating continuity of optimized media delivery according to one embodiment of the present invention. The network architecture or environment 800 is illustrated as including the same global headend data center 102 containing an origin server 104, regional headend data center 106 containing caches 108, third party CDN 126 containing caches 128, mobile/cellular network 136 containing caches 138, home 110 containing a STB or home GW 112 which further contains a local cache 114, and client 116 as in FIGS. 1-4. The communication arrow 802 represents the mobility of the client 116 between its in-home 110 connectivity (e.g., WiFi) to global/regional headend 102/106 and its out-of-home cellular connectivity to mobile network 136, e.g., via RAN infrastructure 804, with content possibly passing through CDN 126 to get to client 116 over the mobile network 136. In one embodiment, the response to the initial playback request 154/164/174/184 from client 116 contains information about both the in-home accessible caches 108/114 and the out-of-home accessible caches 128/138. In another embodiment, the client 116 detects the change in network (i.e., WiFi to cellular or cellular to WiFi) and initiates a new discovery step upon changing networks (e.g., sending a new request 174/184 when leaving the home and transitioning to the mobile/cellular network 136 or sending a new request 154/164 when entering the home and transitioning to the in-home WiFi network and pairing with STB/GW 114). When initiating a new discovery step, a process similar to the processes as described in FIGS. 5-7 may be executed. In one embodiment, multiple layers of caching may take place with origin server 104 pushing content to CDN 126 local cache 128, and CDN 126 local cache 128 pushing content to mobile network 136 local cache 138. In another embodiment, multiple layers of caching may take place with origin server 104 pushing content to CDN 126 local cache 128, and mobile network 136 local cache 138 pulling content from CDN 126 local cache 128 upon request from client 116, if it does not already have a current version of the content. In another embodiment, multiple layers of caching may take place with origin server 104 pushing content to regional headend's local cache 108, and local cache 108 pushing content to premises-based local cache 114. In a still further embodiment, multiple layers of caching may take place with origin server 104 pushing content to local cache 108 of the regional headend 106, and premises-based local cache 114 pulling content from the regional headend's local cache 108, e.g., upon request from client 116, if it does not already have a current version of the content.

Figure 12:
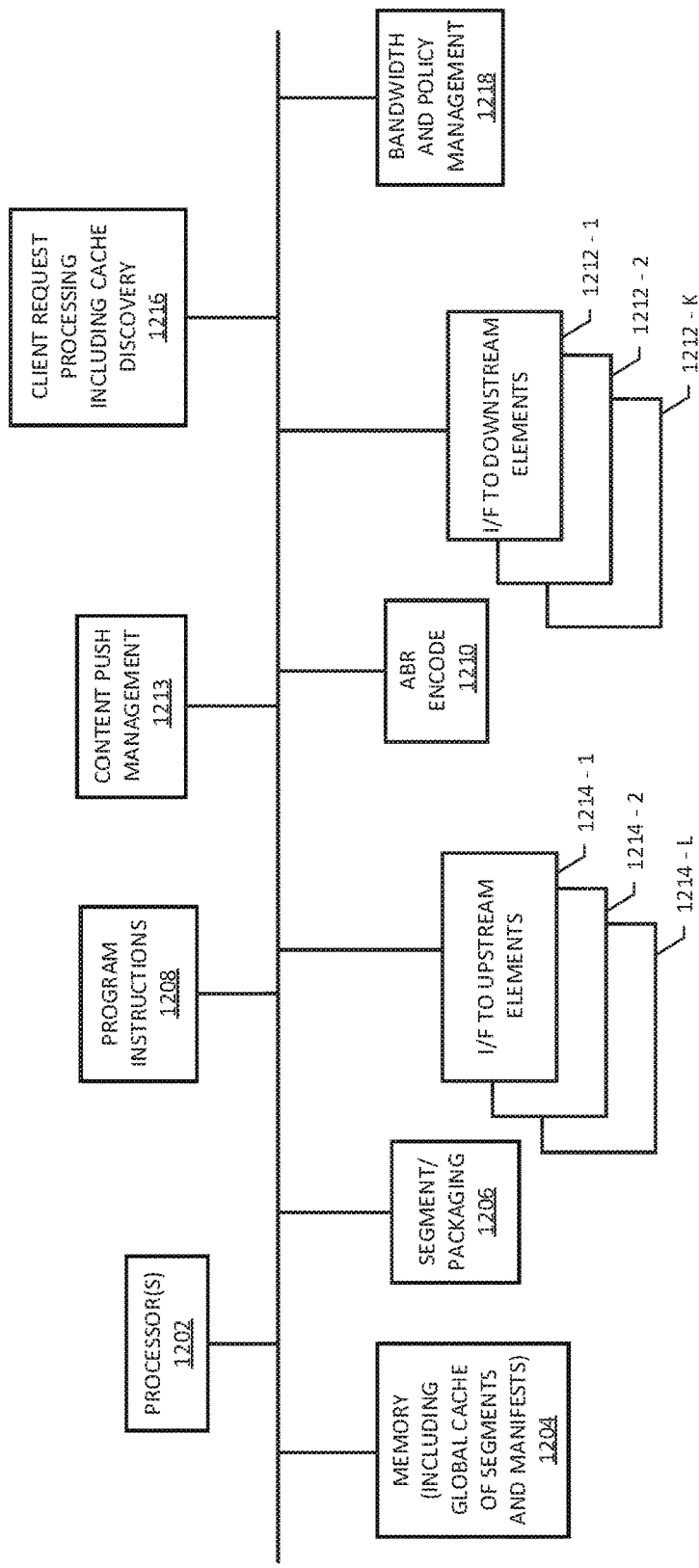
FIG. 12 depicts a block diagram of an apparatus that may be configured or arranged as a network element or node for effectuating one or more methods of the present patent application.

An example element operative as a subsystem or apparatus in accordance with the teachings herein is shown in FIG. 12, may be provided at a global/cloud headend, a regional headend, a mobile network, or a CDN, depending on the implementation. As illustrated, FIG. 12 depicts a block diagram including one or more network components that may be configured as an apparatus or server node 1200 for facilitating one or more aspects of optimized media delivery according to an embodiment of the present patent disclosure, wherein apparatus 1200 is exemplary of nodes 104, 927, etc., for instance. Depending on the local cache implementation and/or network architecture of an ABR communications network, apparatus 1200 may be configured in different ways suitable for operation at multiple hierarchical levels, e.g., at a super headend node, regional headend node, video hub office node, ABR origin server node, central or regional or edge distribution node in a CDN, etc., on the basis of where the content sources are disposed. Accordingly, suitable network interfaces, e.g., I/F 1214-1 to 1214-L, operative for effectuating communications with other network infrastructure elements and databases (e.g., source feeds, global databases for storing encoded media fragments, metadata/manifest files, etc.) as well as interfaces 1212-1 to 1212-K for effectuating communications sessions with one or more subscribers, local caches, MABR network elements, etc., may be provided as part of the network apparatus 1200. One or more processors 1202 may be provided as part of a suitable computer architecture for providing overcall control of the apparatus 1200, which processor(s) 1202 may be configured to execute various program instructions stored in appropriate memory modules or blocks, e.g., persistent memory 1204 as well as program instructions 1208, including additional modules or blocks specific to client request processing, encoding, media segmentation, content pushing, etc. By way of illustration, ABR encode/transcode block 1210 is operative with a media segmentation and packaging block 1206 for generating segments of multi-bitrate representations of various source media, for which suitable metadata files may be generated by a manifest generator (not specifically shown). A client request processing module 1216 may be configured to process initial content requests from client devices, including cache discovery information, according to the embodiments of the present invention. A content push policy management module 1213 is operative in conjunction with the client request processing module 1216 for pushing, e.g., unicast and/or multicast push, the requested media segments and/or metadata files to suitable local caches. A bandwidth and content policy management module 1218 may also be provided as a backend management node for enforcing applicable policies with respect to clients' media requests.

A skilled artisan will further recognize that an example server node may be suitably configured to include a mobility-based content delivery management module as part of the program instructions 1208 for determining whether a mobile client device is within a premises or outside and accordingly direct/redirect the pushing of requested content either to the premises node-based local cache or a CDN/mobile network based local cache, as set forth in the example implementation of FIG. 8. It will be further recognized that executable program instructions of the persistent memory modules 1208 operating in conjunction with other modules 1216, 1213, etc., may be configured to perform any of the server-based processes and/or sub-processes involving any combination, sub-combination, and/or recombination of FIGS. 5-7 and 11A-11C, described hereinabove.

Figure 13:
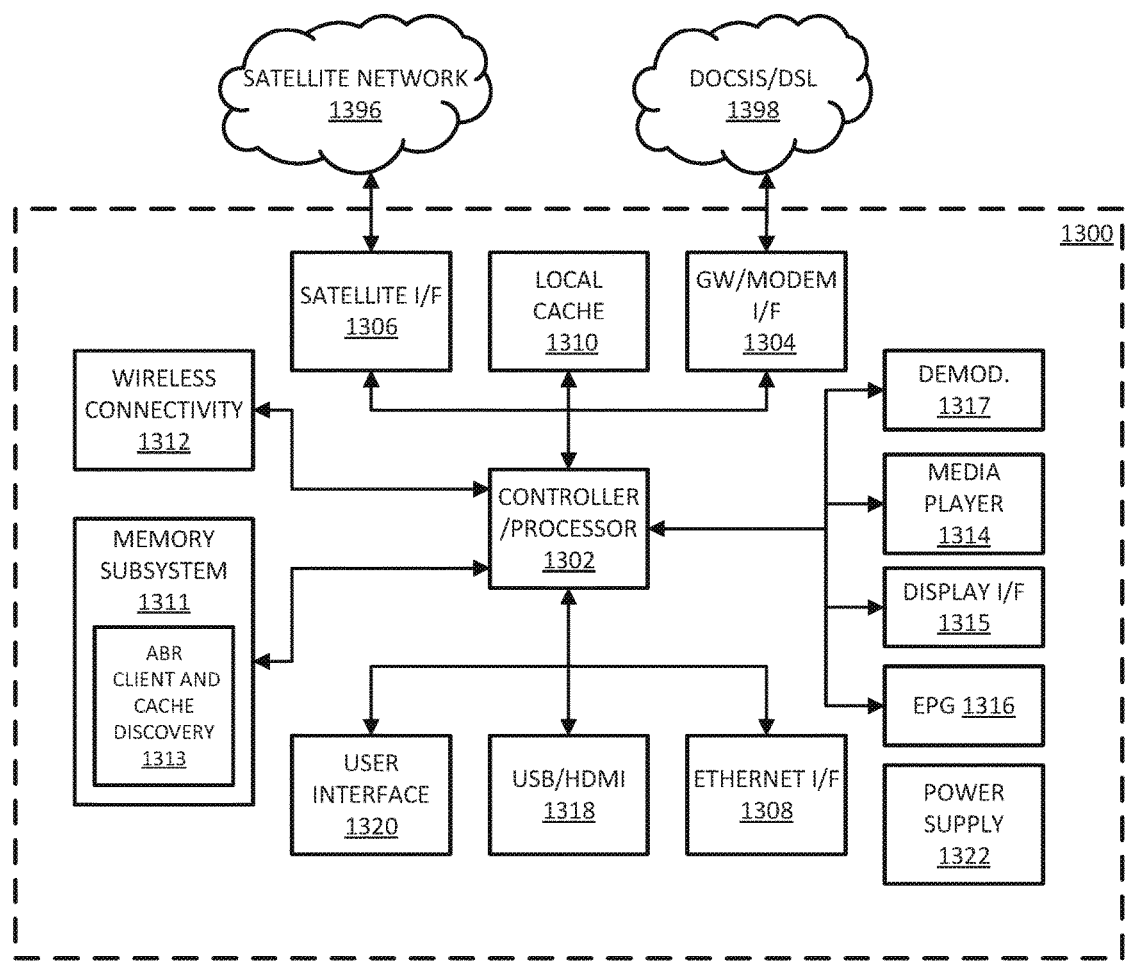
FIG. 13 depicts a block diagram of an apparatus that may be configured or arranged as user equipment (UE) client device for purposes of the present patent application.

FIG. 13 is a block diagram of an example client device or subscriber station configured for performing various client-side processes according to one or more embodiments of the present patent disclosure. Client device 1300 is generally representative of an ABR client device shown in one or more Figures described above, e.g., client/UE devices 914-1 to 914-N, 116, as well as STB 1004, etc., and may include appropriate hardware/software components and subsystems configured for performing any of the device-side processes (either individually or in any combination thereof) with respect to local cache discovery, content request generation, metadata parsing, HTTP proxy control, etc., in addition to media segment retrieval and rendering, for purposes of the present patent application. One or more microcontrollers/processors 1302 are provided for the overall control of the client device 1300 and for the execution of various stored program instructions embodied in a persistent memory 1313, e.g., as a streaming client application having cache discovery capability and/or browser proxy agent, etc., that may be part of a memory subsystem 1311 of the subscriber device 1300. Controller/processor complex referred to by reference numeral 1302 may also be representative of other specialty processing modules such as graphic processors, video processors, digital signal processors (DSPs), and the like, operating in association with suitable video and audio interfaces (not specifically shown). Appropriate interfaces such as network I/F modules 1304 and 1306 involving or operating with tuners, demodulators, descramblers, MPEG/H.264/H.265 decoders/demuxes may be included for processing and interfacing with IPTV and other content signals received via a DSL/CMTS network 1398 or a satellite network 1396 as an OTT application. Where an STB is configured as an example client device, suitable demodulators 1317 (e.g., may include NTSC demodulator and/or ATSC/PAL demodulator, and the like) as well as STB-based local cache 1310 may also be included. One or more media players 1314 may be provided for operating in conjunction with the other subsystems of the client device 1300 for facilitating user control over media playback. Other I/O or interfaces such as a display interface 1315, Electronic Program Guide (EPG) 1316 for identifying media service channels (e.g., in an STB implementation), touch screen or keypad interface 1320, USB/HDMI ports 1318, Ethernet I/F 1308, and short-range and wide area wireless connectivity interfaces 1312 may also be provided depending on device configuration. A hard disk drive (HDD) or DVR system (not specifically shown) may be included in an STB implementation for local storage of various program assets. A suitable power supply block 1322, which may include AC/DC power conversion to provide power for the device 1300. It should be appreciated that the actual power architecture for the subscriber device 1300 may vary by the hardware platform used, e.g., depending upon the core SoC (System-on-Chip), memory, analog front-end, analog signal chain components and interfaces used in the specific platform, and the like.

It will be further recognized that executable program instructions of the memory modules 1311, 1313, operating in conjunction with other modules 1314, etc., may be configured to perform any of the client-based processes and/or sub-processes involving any combination, sub-combination, and/or recombination of FIGS. 5-7 and 11A-11C, described hereinabove.

Based on the foregoing, it will be appreciated several variations and use case scenarios may be effectuated within the scope of the present invention. For example, in one embodiment, a first client wishes to playback a private copy recording, and the recording is only applicable to that first client, and a plurality of other clients within its physical household. The content may be positioned in a local cache in the home, e.g., in a STB/GW, and distributed to all clients within the home from the STB/GW. In one embodiment, the discovery of the STB/GW is performed by the first client through a pairing operation, e.g., using DIAL (Discovery and Launch protocol), DVB-CSS (Digital Video Broadcasting Companion Screens & Streams protocol), UPnP (Universal Plug and Play protocol), Bonjour, etc. There are many STB/GW pairing protocols suitable for discovering a local caching service, as should be known to those skilled in the art; the methods described herein are compatible with all such pairing protocols. Once the caching capabilities of the STB/GW are known to the first client, the first client may request that the origin server push the content to the local cache. In another embodiment, the location of the STB/GW is already known to the origin server, and a client may simply request the content. In one embodiment, the first client informs the origin server of the local address from which the cache may be reached by the plurality of clients in the home (understanding that the origin server may push the content to the cache via a different public or private address). In another embodiment, the origin server discovers the local address from which the cache may be reached by the plurality of clients in the home from the cache directly, once it has connected to the cache via a different public or private address. In one embodiment, the origin server responds to the first client's request with a pointer to the content in the local cache. In another embodiment, the origin server responds to the first client's request with a list of pointers to assets available in the local cache. In another embodiment, the first client is requesting HTTP adaptive streaming content, e.g., HTTP Live Streaming (HLS), HTTP Dynamic Streaming (HDS), HTTP Smooth Streaming (HSS), or Dynamic Adaptive Streaming over HTTP (DASH), and the origin server responds to the first client's request for media with a manifest that directs the first client to the local cache to retrieve the other manifests and content segments. In another embodiment, the origin server responds with a manifest containing the non-localized addresses from which the other manifests and content segments are typically retrieved and the first client modifies the manifest with the address of the local cache, before presenting the manifest to the player. In another embodiment, the origin server responds with a manifest containing the non-localized addresses from which the other manifests and content segments are typically retrieved and the first client modifies the manifest with the address of a local HTTP proxy server in the first client; upon receiving requests for other manifests or content segments, the local HTTP proxy server in the first client redirects the requests to the local cache (e.g., as described in commonly owned U.S. Pat. No. 8,874,779; incorporated by reference herein). In one embodiment, the first client federates delivery between the local cache and the non-localized location from which the other manifests and content segments are typically retrieved, using local cache as the primary and the non-localized location as the backup, e.g., as described in commonly owned U.S. Pat. No. 8,893,208; incorporated by reference herein.

In another variation, a second client in the same household as the first client wants to play the same content. In one embodiment, the second client performs the same operations as the first client, discovering the local cache, requesting content from the origin server, retrieving content from the local cache, and federating with the non-localized content location. Upon reception of the second content request, by the origin server, from the second client, and discovering the local cache (either through a priori knowledge or through explicit direction from the second client), the origin server detects that the content has already been pushed to the local cache and does not push duplicate content; the origin server immediately responds to the second client with the manifest file for playback (the manifest file containing either address pointing at the local cache or addresses pointing at the non-localized content location, for the second client to replace with either local cache addresses or local HTTP proxy server addresses).

In another embodiment, a first client wishes to playback long-tail content, and the content is probably only applicable to that first client, but there may be a plurality of other clients in the same region that could watch the content in the future. The content may be positioned in a local cache in the network operator's regional data center closest to the first client. In one embodiment, the discovery of the regional data center cache is performed by the client through either a pairing operation with the STB/GW, or through direct discovery by probing the regional data center. There are many network service discovery protocols suitable for discovering a local caching service, as should be known to those skilled in the art; the methods described herein are compatible with all such service discovery protocols. Once the caching capabilities of the STB/GW are known to the first client, the first client may request that the origin server push the content to the local cache. In another embodiment, the location of the regional data center cache is already known to the origin server, and a client may simply request the content. In one embodiment, the first client informs the origin server of the local address from which the cache may be reached by the plurality of clients in the region (understanding that the origin server may push the content to the cache via a different public or private address). In another embodiment, the origin server discovers the local address from which the cache may be reached by the plurality of clients in the home from the cache directly, once it has connected to the cache via a different public or private address. In one embodiment, the origin server responds to the first client's request with a pointer to the content in the local cache. In another embodiment, the origin server responds to the first client's request with a list of pointers to assets available in the local cache. In another embodiment, the first client is requesting HTTP adaptive streaming content, e.g., HLS, HDS, HSS, or DASH, and the origin server responds to the first client's request for media with a manifest that directs the first client to the local cache to retrieve the other manifests and content segments. In another embodiment, the origin server responds with a manifest containing the non-localized addresses from which the other manifests and content segments are typically retrieved and the first client modifies the manifest with the address of the local cache, before presenting the manifest to the player. In another embodiment, the origin server responds with a manifest containing the non-localized addresses from which the other manifests and content segments are typically retrieved and the first client modifies the manifest with the address of a local HTTP proxy server in the first client; upon receiving requests for other manifests or content segments, the local HTTP proxy server in the first client redirects the requests to the local cache. In one embodiment, the first client federates delivery between the local cache and the non-localized location from which the other manifests and content segments are typically retrieved, using local cache as the primary and the non-localized location as the backup.

In one embodiment, a second client in the same region as the first client wants to play the same content. In one embodiment, the second client performs the same operations as the first client, discovering the local cache, requesting content from the origin server, retrieving content from the local cache, and federating with the non-localized content location. Upon reception of the second content request, by the origin server, from the second client, and discovering the local cache (either through a priori knowledge or through explicit direction from the second client), the origin server detects that the content has already been pushed to the local cache and does not push duplicate content; the origin server immediately responds to the second client with the manifest file for playback (the manifest file containing either address pointing at the local cache or addresses pointing at the non-localized content location, for the second client to replace with either local cache addresses or local HTTP proxy server addresses).

In a still further variation of the foregoing embodiments, a client device may be aware of only a premises-based local cache (e.g., GW/STB local cache), but the origin server may be configured to override the premises-based local cache with some other local cache e.g., a regional headend's local cache or a CDN's local cache.

In another embodiment, a mobile and/or nomadic first client wishes to playback content while connected to a cellular network and/or while roaming outside of the content provider's normal service area making the content probably only applicable to that first client, though there may be a plurality of other clients on the same cellular network and/or in the same remote area that could watch the content in the future. The content may be positioned in a local cache in the mobile operator's cellular network and/or in a CDN with a point of presence (POP) close to the first client. In one embodiment, the discovery of the mobile/CDN cache is performed by the client through direct discovery by probing the mobile/CDN network, or through a priori knowledge of the service provider. There are many network service discovery protocols suitable for discovering a local caching service, as should be known to those skilled in the art; the methods described herein are compatible with all such service discovery protocols. Once the caching capabilities local mobile/CDN network are known to the first client, the first client may request that the origin server push the content to the local cache. In another embodiment, the location of the local mobile/CDN network cache is already known to the origin server, and a client may simply request the content. In one embodiment, the first client informs the origin server of the local address from which the cache may be reached by the plurality of clients on the same mobile network or in the same remote area (understanding that the origin server may push the content to the cache via a different public or private address). In another embodiment, the origin server discovers the local address from which the cache may be reached by the plurality of clients in the home from the cache directly, once it has connected to the cache via a different public or private address. In one embodiment, the origin server responds to the first client's request with a pointer to the content in the local cache. In another embodiment, the origin server responds to the first client's request with a list of pointers to assets available in the local cache. In another embodiment, the first client is requesting HAS media content, and the origin server responds to the first client's request for media with a manifest that directs the first client to the local cache to retrieve the other manifests and content segments. In another embodiment, the origin server responds with a manifest containing the non-localized addresses from which the other manifests and content segments are typically retrieved and the first client modifies the manifest with the address of the local cache, before presenting the manifest to the player. In another embodiment, the origin server responds with a manifest containing the non-localized addresses from which the other manifests and content segments are typically retrieved and the first client modifies the manifest with the address of a local HTTP proxy server in the first client; upon receiving requests for other manifests or content segments, the local HTTP proxy server in the first client redirects the requests to the local cache. In one embodiment, the first client federates delivery between the local cache and the non-localized location from which the other manifests and content segments are typically retrieved, using local cache as the primary and the non-localized location as the backup.

In one embodiment, a second client on the same cellular network or in the same remote area as the first client wants to play the same content. In one embodiment, the second client performs the same operations as the first client, discovering the local cache, requesting content from the origin server, retrieving content from the local cache, and federating with the non-localized content location. Upon reception of the second content request, by the origin server, from the second client, and discovering the local cache (either through a priori knowledge or through explicit direction from the second client), the origin server detects that the content has already been pushed to the local cache and does not push duplicate content; the origin server immediately responds to the second client with the manifest file for playback (the manifest file containing either address pointing at the local cache or addresses pointing at the non-localized content location, for the second client to replace with either local cache addresses or local HTTP proxy server addresses).

As noted previously, at least some of the embodiments/use cases set forth above may involve teachings from commonly owned U.S. Pat. Nos. 8,874,779 and/or 8,893,208; incorporated by reference hereinabove.

One skilled in the art will further recognize that various apparatuses, subsystems, functionalities/applications and/or one or more network elements as well as the underlying network infrastructures set forth above for facilitating a recording service selection scheme may be architected in a virtualized environment according to a network function virtualization (NFV) architecture in additional or alternative embodiments of the present patent disclosure. For instance, various physical resources, databases, services, applications and functions executing within an example network of the present application may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of software, e.g., ABR encoding schemes, segmentation mechanisms, media asset package databases, etc., as well as platforms and infrastructure of an ABR network may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for distributing content in an adaptive bitrate (ABR) streaming network, the method comprising:
   receiving, at an origin server, an initial content request from a client device for a particular content, the client device operative with an ABR streaming media player, wherein the initial content request includes a plurality of cache addresses that correspond to a respective plurality of local caches;
   responsive to receiving the initial content request, selecting an optimal local cache from the plurality of local caches that are not blacklisted;
   determining that the selected optimal local cache does not already have the requested particular content;
   pushing the particular content in one or more bitrate representations to the selected optimal local cache; and
   generating a response message to the client device, responsive to the initial content request, the response message including information by which the client device can access the particular content from the selected optimal local cache.

2. The method as recited in claim 1, wherein the plurality of cache addresses are discovered by the client device and further wherein the origin server locates the selected optimal local cache proximate to the client device.

3. The method as recited in claim 2, further comprising:
   receiving at least one of address information and geolocation information of the client device in the initial content request; and
   responsive to receiving the at least one of the address information and geolocation information of the client device, locating the selected optimal local cache for pushing the particular content thereto.

4. The method as recited in claim 1, wherein the particular content is pushed to the selected optimal local cache via one of unicast transmission and multicast transmission.

5. The method as recited in claim 1, further comprising:
   determining, by the origin server, local addresses by which the client device can access the particular content on the selected optimal local cache; and
   transmitting the local addresses to the client device in response to the initial content request.

6. The method as recited in claim 5, wherein the local addresses are determined by querying the selected optimal local cache.

7. The method as recited in claim 1, wherein the particular content requested by the client device comprises at least one of live TV content, IPTV content, time-shifted (TS) TV content, place-shifted (PS) TV content, gaming content, and Video on Demand (VOD) content.

8. The method as recited in claim 1, wherein the particular content requested by the client device comprises HTTP adaptive streaming (HAS) media content compliant with at least one of HTTP Live Streaming (HLS), HTTP Dynamic Streaming (HDS), Dynamic Adaptive Streaming over HTTP (DASH), and HTTP Smooth Streaming (HSS).

9. The method as recited in claim 8, further comprising:
pushing a manifest file by the origin server for the HAS media content to the selected optimal local cache, the manifest file including relative Uniform Resource Locators (URLs); and
issuing an HTTP redirect message to the client device, responsive to the initial content request from the client device, for facilitating retrieval of the manifest file from the selected optimal local cache by the client device.

10. The method as recited in claim 8, further comprising:
generating a manifest file by the origin server for the HAS media content, the manifest file including URLs that point to the selected optimal local cache; and
transmitting the manifest file the client device in response to the initial content request.

11. A network node operating as an origin server disposed in an adaptive bitrate (ABR) streaming network, the network node comprising:
one or more processors;
a plurality of network interfaces configured to receive media assets from one or more content sources; and
one or more persistent memory modules having program instructions stored thereon which, when executed by the one or more processors, perform the following:
responsive to receiving an initial content request from a client device for a particular media asset, the client device operative with an ABR streaming media player, wherein the initial content request includes a plurality of cache addresses that correspond to a respective plurality of local caches;
responsive to receiving the initial content request, selecting an optimal local cache from the plurality of caches that are not blacklisted;
determining that the selected optimal local cache does not already have the requested particular media asset;
pushing the particular media asset in one or more bitrate representations to the selected optimal local cache; and
generating a response message to the client device, responsive to the initial content request, the response message including information by which the client device can access the particular media asset from the selected optimal local cache.

12. The network node as recited in claim 11, wherein the plurality of cache addresses are discovered by the client device and the program instructions further comprise instructions configured to locate the selected optimal local cache proximate to the client device.

13. The network node as recited in claim 12, wherein the program instructions further comprise instructions configured to perform:
receiving at least one of address information and geolocation information of the client device in the initial content request; and
responsive to receiving the at least one of the address information and geolocation information of the client device, locating the selected optimal local cache for pushing the particular media asset thereto.

14. The network node as recited in claim 11, wherein the program instructions for pushing the particular media asset further comprise instructions configured to perform pushing of the particular media asset to the selected optimal local cache via one of unicast transmission and multicast transmission.

15. The network node as recited in claim 11, wherein the particular media asset requested by the client device comprises HTTP adaptive streaming (HAS) media content compliant with at least one of HTTP Live Streaming (HLS), HTTP Dynamic Streaming (HDS), Dynamic Adaptive Streaming over HTTP (DASH), and HTTP Smooth Streaming (HSS).

16. The network node as recited in claim 15, wherein the program instructions further comprise instructions configured to perform:
pushing a manifest file by the origin server for the HAS media content to the selected optimal local cache, the manifest file including relative Uniform Resource Locators (URLs); and
issuing an HTTP redirect message to the client device, responsive to the initial content request from the client device, for facilitating retrieval of the manifest file from the selected optimal local cache by the client device.

17. The network node as recited in claim 15, wherein the program instructions further comprise instructions configured to perform:
generating a manifest file by the origin server for the HAS media content, the manifest file including URLs that point to the selected optimal local cache; and
transmitting the manifest file the client device in response to the initial content request.

18. A client device configured to operate in an adaptive bitrate (ABR) streaming network, the client device comprising:
one or more processors;
an ABR streaming media player;
a plurality of network interfaces configured to operate with at least one of a wired access network and a wireless access network; and
one or more persistent memory modules having program instructions stored thereon which, when executed by the one or more processors, perform the following:
discovering a plurality of cache addresses that correspond to a respective plurality of local caches accessible to the client device;
responsive to receiving a user request for playing a particular content using the ABR streaming media player, generating an initial content request for the particular content, the initial content request including the plurality of cache addresses that correspond to the respective plurality of local caches accessible to the client device;
transmitting the initial content request including the plurality of local cache addresses to an origin server disposed in the ABR streaming network in order to facilitate pushing of the particular content to a selected optimal local cache by the origin server upon determining that the selected optimal local cache does not already have the requested particular content and is not blacklisted; and
receiving from the origin server, a response message including information for the selected optimal local cache to which the origin server has pushed the particular content, the selected optimal local cache selected from the respective plurality of local caches.

19. The client device as recited in claim 18, wherein the program instructions further comprise instructions configured to perform:
determining whether geolocation information of the client device is to be added to the initial content request; and if so, adding the geolocation information of the client device to the initial content request in addition to the plurality of cache addresses prior to transmitting it to the origin server.

20. The client device as recited in claim 18, wherein the plurality of cache addresses are discovered by using at least one of Discovery and Launch (DIAL) protocol, Digital Video Broadcasting Companion Screens and Streams (DVB-CSS) protocol, Universal Plug and Play (UpnP) protocol, and Bonjour protocol.

21. The client device as recited in claim 18, wherein the program instructions further comprise instructions configured to perform:
   responsive to a response received from the origin server, retrieving the particular content from the selected optimal local cache; and
   presenting the particular content to the ABR streaming media player for rendering.

22. The client device as recited in claim 18, wherein the particular content requested comprises HTTP adaptive streaming (HAS) media content compliant with at least one of HTTP Live Streaming (HLS), HTTP Dynamic Streaming (HDS), Dynamic Adaptive Streaming over HTTP (DASH), and HTTP Smooth Streaming (HSS).

* * * * *